(12) United States Patent
Lubnin et al.

(10) Patent No.: US 7,582,698 B2
(45) Date of Patent: Sep. 1, 2009

(54) WATER DISPERSIONS OF NON-UNIFORM POLYURETHANE PARTICLES

(75) Inventors: Alexander V. Lubnin, Copley, OH (US); Dennis Malaba, Akron, OH (US); Vic Stanislawczyk, Strongsville, OH (US); Gary D. Calhoun, Medina, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 319 days.

(21) Appl. No.: 10/733,027

(22) Filed: Dec. 11, 2003

(65) Prior Publication Data

US 2005/0004306 A1    Jan. 6, 2005

Related U.S. Application Data

(60) Provisional application No. 60/484,430, filed on Jul. 2, 2003.

(51) Int. Cl.
| | |
|---|---|
| *C08J 3/00* | (2006.01) |
| *C08K 3/20* | (2006.01) |
| *C08L 75/00* | (2006.01) |
| *C08G 18/28* | (2006.01) |
| *C08G 18/48* | (2006.01) |
| *C08G 18/08* | (2006.01) |
| *C08G 18/81* | (2006.01) |
| *B32B 27/00* | (2006.01) |
| *B32B 27/40* | (2006.01) |

(52) U.S. Cl. .............. 524/589; 428/423.1; 524/590; 524/591; 524/839; 524/840; 524/908; 525/457; 525/458; 525/460; 525/902; 525/903; 528/45

(58) Field of Classification Search .............. 524/589, 524/590, 591, 839, 840, 908; 156/327, 330.9, 156/331.4, 331.7; 427/372.2, 385.5; 428/423.1; 525/457, 458, 460, 902, 903; 528/45
See application file for complete search history.

(56) References Cited

U.S. PATENT DOCUMENTS

| | | | |
|---|---|---|---|
| 4,644,030 A | | 2/1987 | Loewrigkeit et al. ........ 524/457 |
| 4,762,899 A | | 8/1988 | Shikinami |
| 4,999,407 A | * | 3/1991 | Gilch et al. ................. 525/457 |
| 5,137,961 A | | 8/1992 | Goos et al. .................. 524/457 |
| 5,959,003 A | * | 9/1999 | Lo et al. ...................... 523/201 |
| 6,017,998 A | | 1/2000 | Duan et al. .................. 524/591 |
| 6,479,147 B2 | | 11/2002 | Lubnin et al. ............... 428/407 |

FOREIGN PATENT DOCUMENTS

| | | | |
|---|---|---|---|
| JP | 3-167286 | | 7/1991 |
| JP | 03-167286 | * | 7/1991 |

* cited by examiner

*Primary Examiner*—Patrick D Niland
(74) *Attorney, Agent, or Firm*—Samuel B. Laferty; Thoburn T. Dunlap; Joe A. Powell

(57) ABSTRACT

A novel method of preparing an aqueous dispersion of non-uniform polyurethane particles which comprises (a) preparing at least two isocyanate-terminated polyurethane prepolymers having different hydrophilicities; (b) preparing a uniform mixture of said prepolymers; and (c) dispersing the mixed prepolymers in an aqueous medium. The resulting dispersion of the prepolymers may optionally be chain extended. This method enables the preparation of core-shell particles as well as particles of other morphologies, including "raspberry", interpenetrating network, "salt-and-pepper", "ice-cream cone" and particles of gradient composition. Similarly, an aqueous dispersion of two different polyurethane polymers may be obtained by first preparing at least two different isocyanate-terminated polyurethane prepolymers, preparing a uniform mixture of such prepolymers and thereafter dispersing the mixture in an aqueous medium.

44 Claims, 12 Drawing Sheets

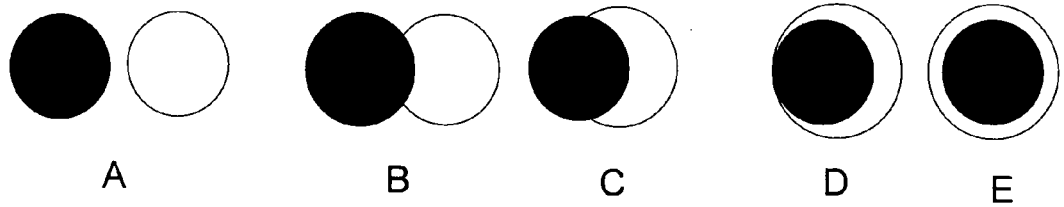

Figure 1. Relationship between interfacial surface tensions and particle morphology.

A – Failed core-shell – physical blend of two separate particles:
  $\sigma_{AB} \gg \sigma_{AW} \sim \sigma_{BW}$
B – symmetric "ice-cream cone": $\sigma_{AB} > \sigma_{AW} \sim \sigma_{BW}$
C – asymmetric "ice-cream cone": $\sigma_{AB} \gtrsim \sigma_{AW} > \sigma_{BW}$
D – asymmetric (or incomplete) core-shell: $\sigma_{AW} \gg \sigma_{AB} > \sigma_{BW}$
E – perfect core-shell particle: $\sigma_{AW} \ggg \sigma_{AB} > \sigma_{BW}$

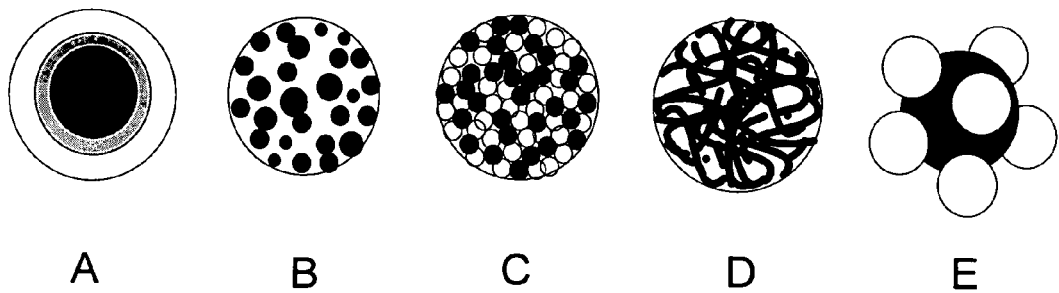

Figure 2. Examples of particle morphologies.

A – core-shell particle with transition gradient interlayer
B – "raspberry" morphology
C – "salt-and-pepper" morphology
D – interpenetrating network
E – lobed particles

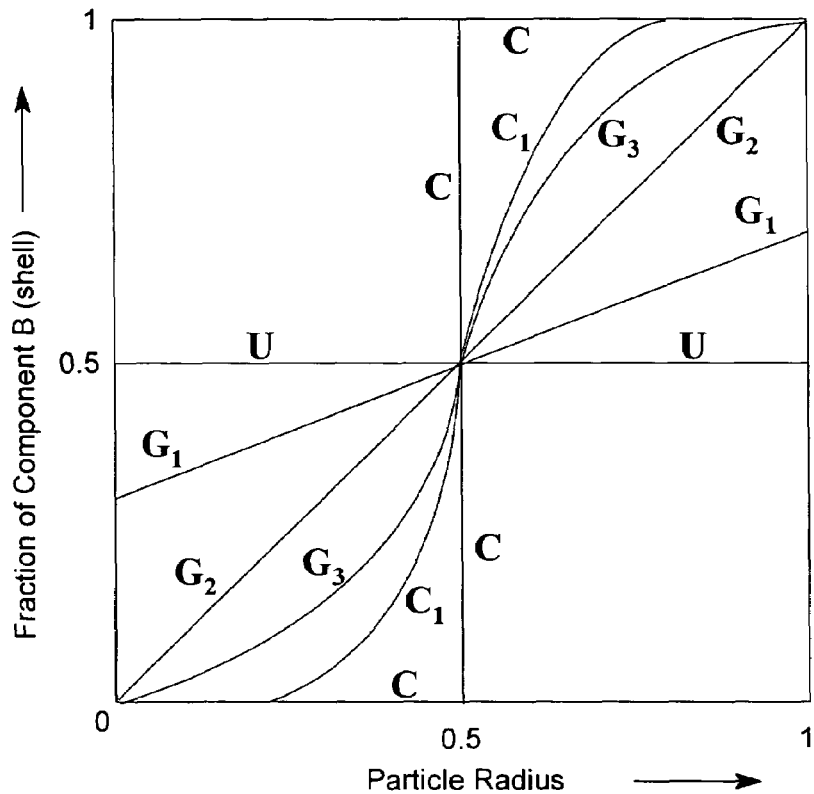
Figure 3. The dynamic of phase separation during the formation of core-shell particles.
U – uniform particles
$G_1$, $G_2$ – constant gradient particles with different levels of separation
$G_3$ – variable gradient particles
$C_1$ – core-shell particle with transition gradient interlayer
C – perfect core-shell particle

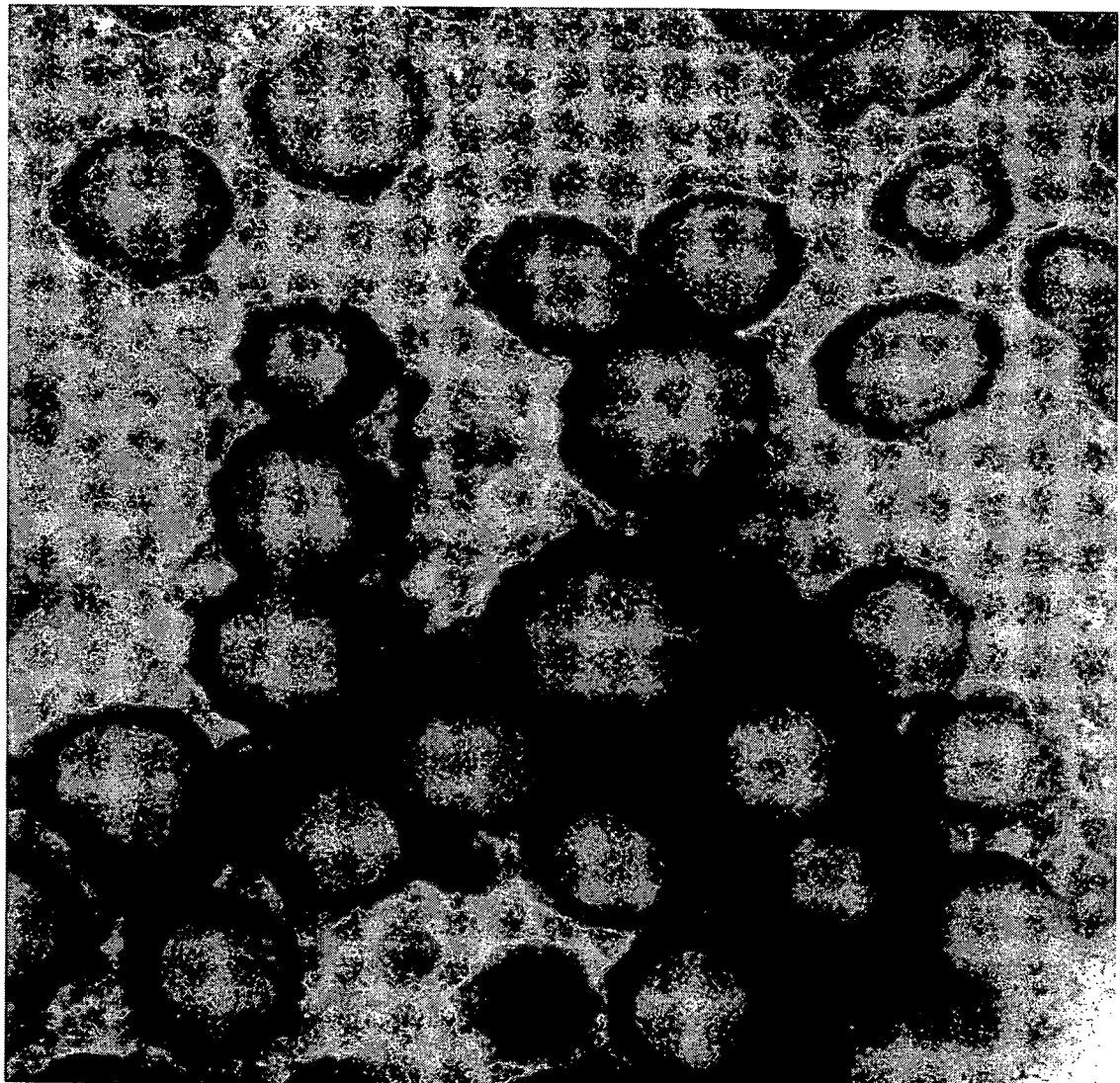
Figure 4. TEM photograph of core-shell particles with brominated shell from Example 1.

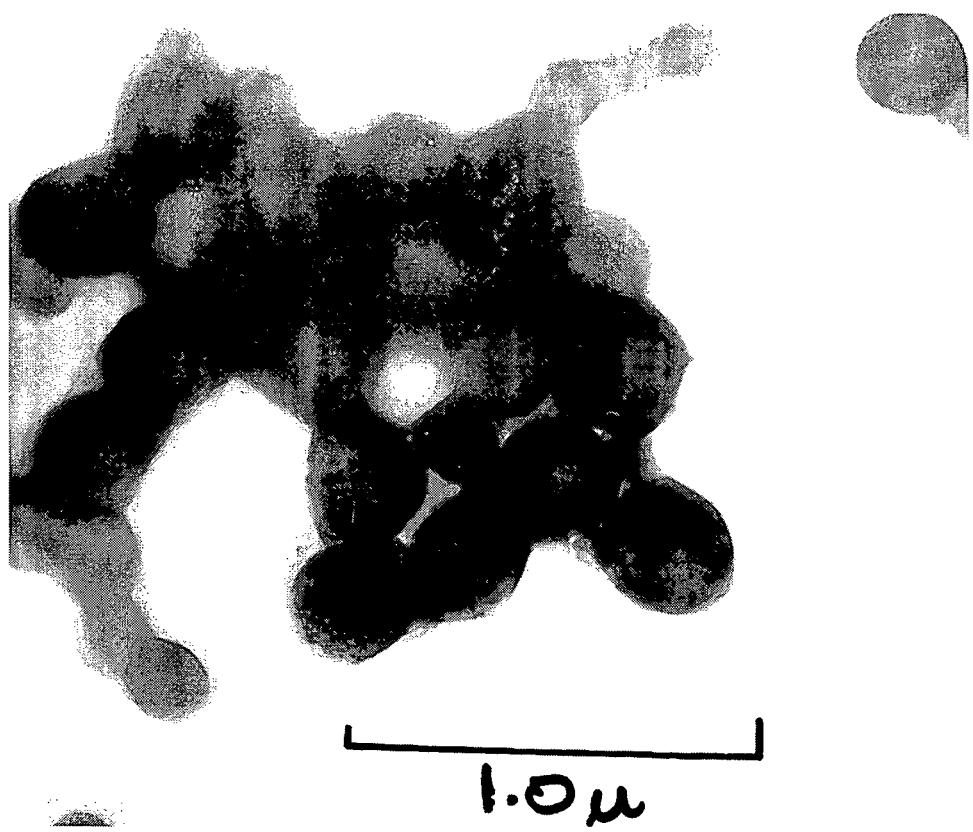
Figure 5. TEM photograph of Polyester core/Polycarbonate shell particles from Example 2 with Cesium hydroxide staining.

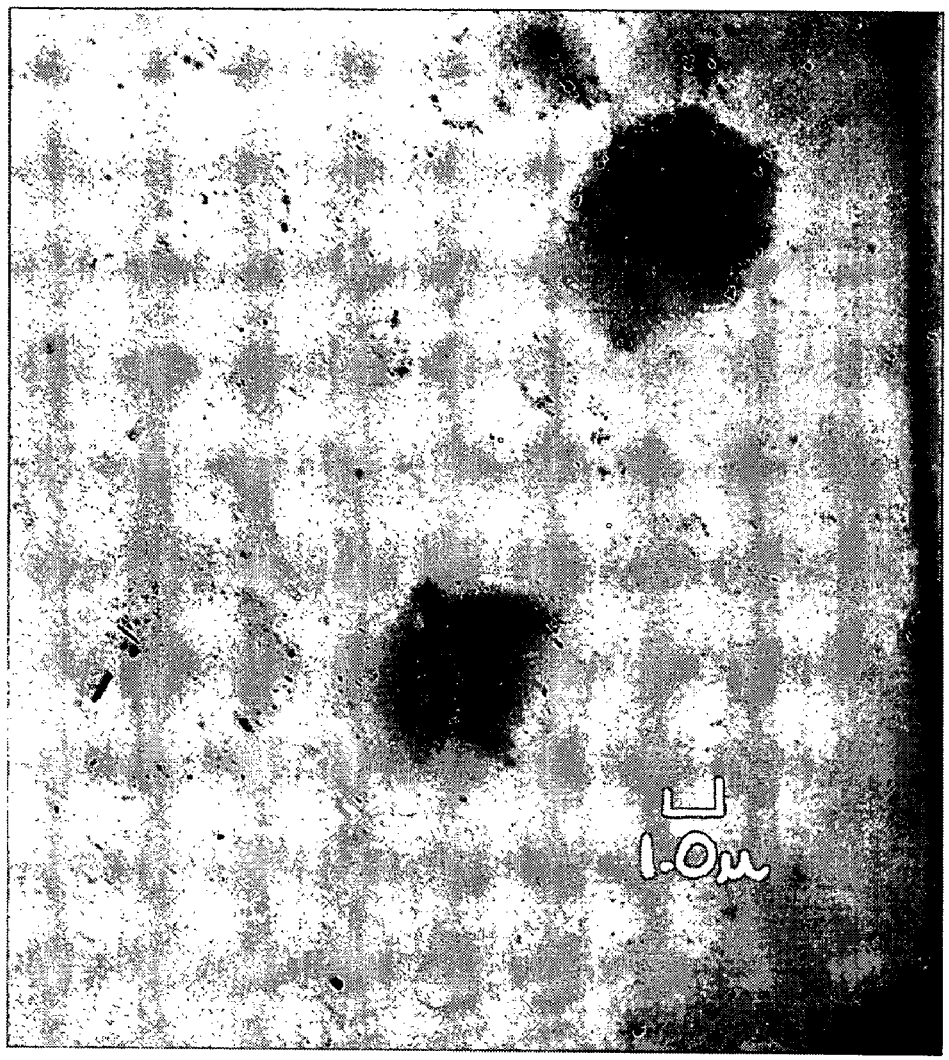
Figure 6. TEM photograph of particles from Comparative Example 3 with cesium hydroxide staining.

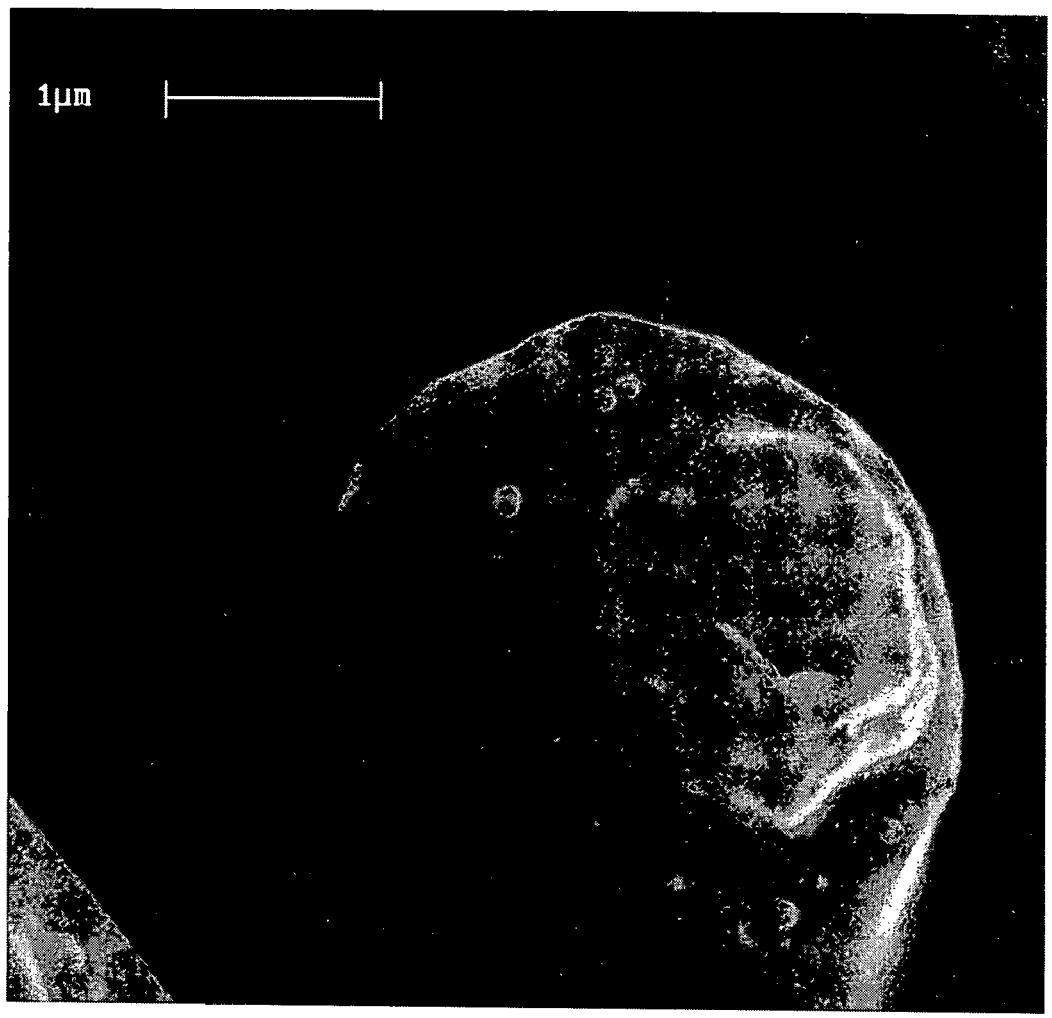
Figure 7. CryoSEM image of core-shell particle with 30% rubbery core (HNA/IPDI) and 70% hard shell (PPG/Des W) from Example 4.

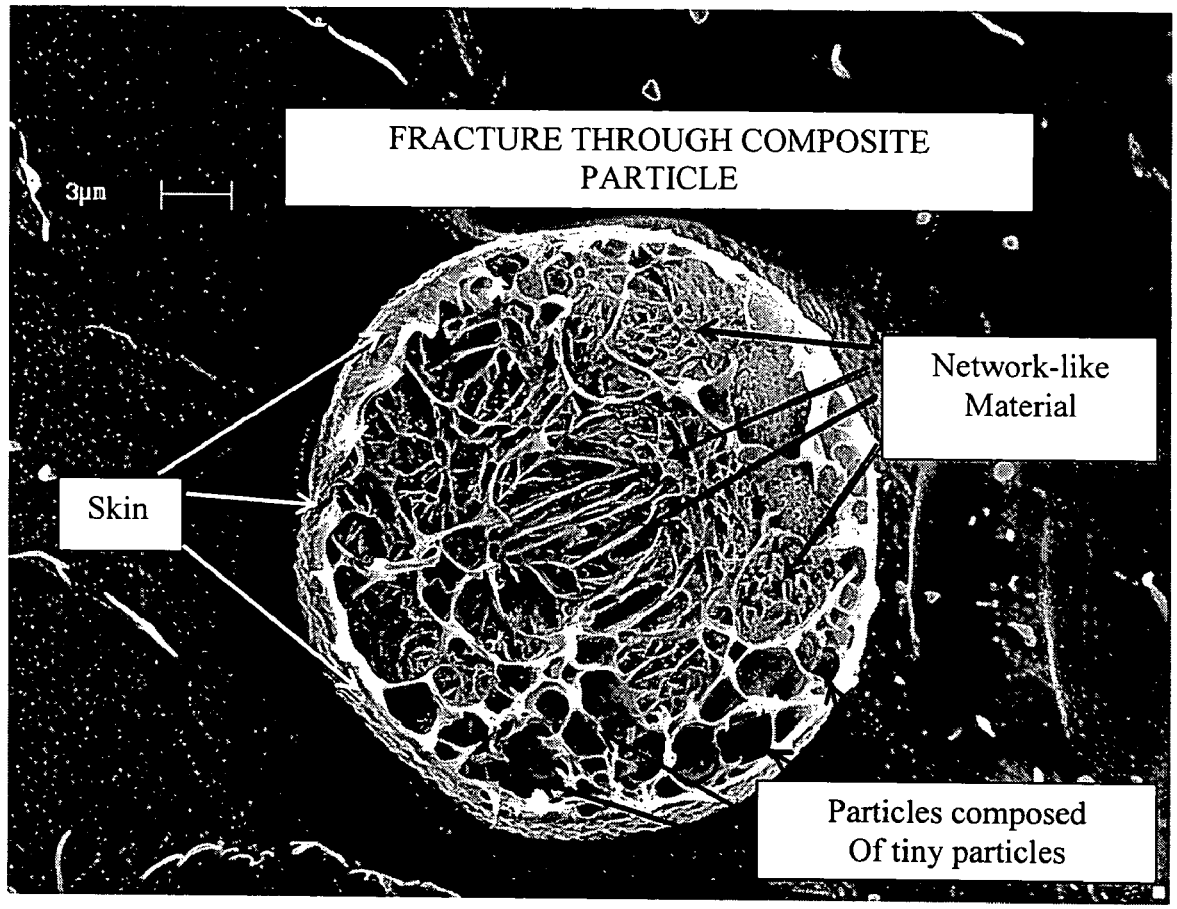
Figure 8. CryoSEM image of core-shell particle with 70% core (HNA/IPDI) and 30% shell (PPG/Des W) from Example 5. (026-137)

Figure 9. TEM image of "ice-cream cone" particles with 20% core (CAPA/Desmodur W) and 80% shell (PPG/IPDI) from Example 6.

Figure 10. TEM (Transmission Electron Microscopy) photograph of particles from dispersion obtained in Example 32.

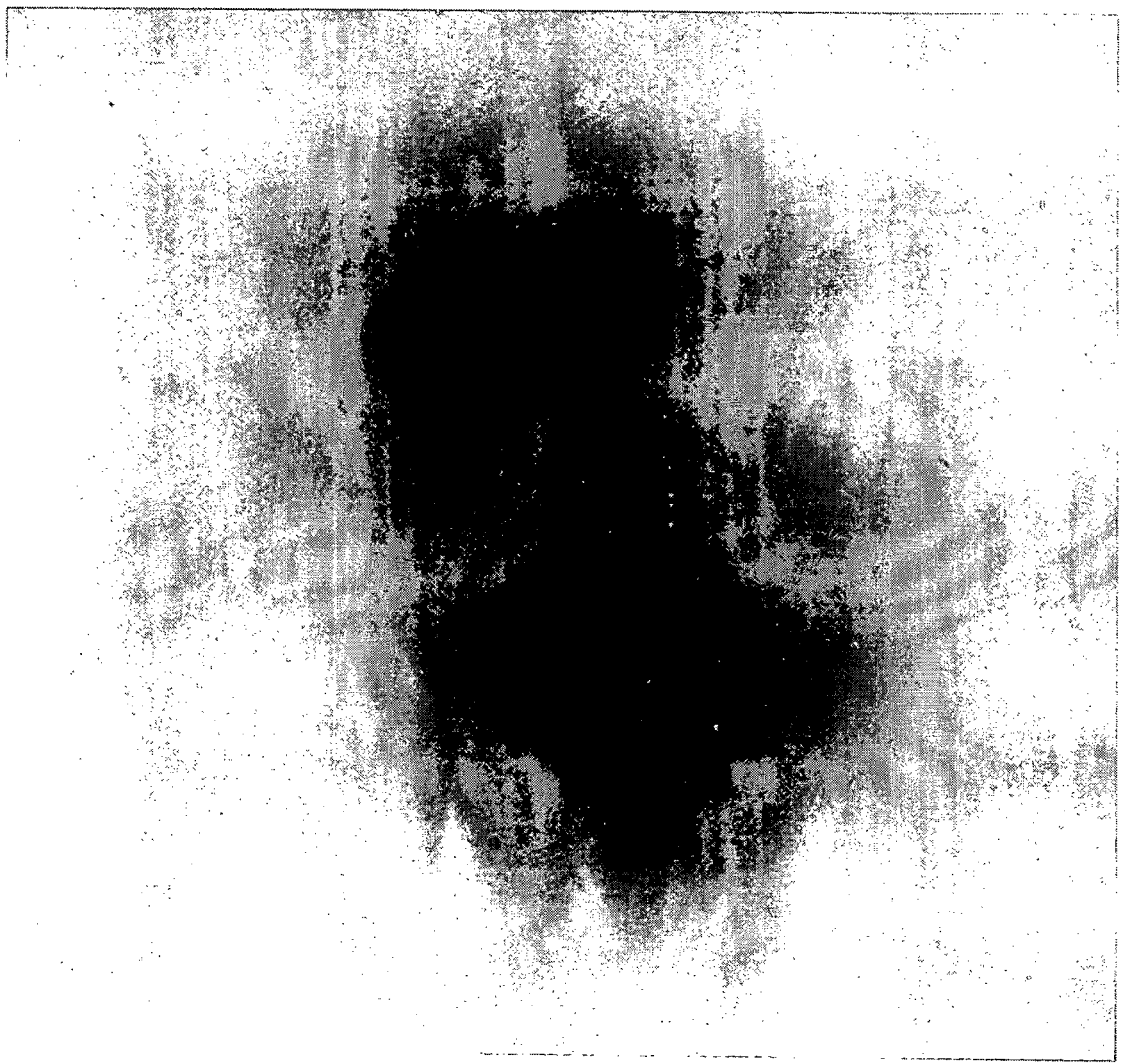
Figure 11. TEM (Transmission Electron Microscopy) photograph of particles from dispersion obtained in Example 33.

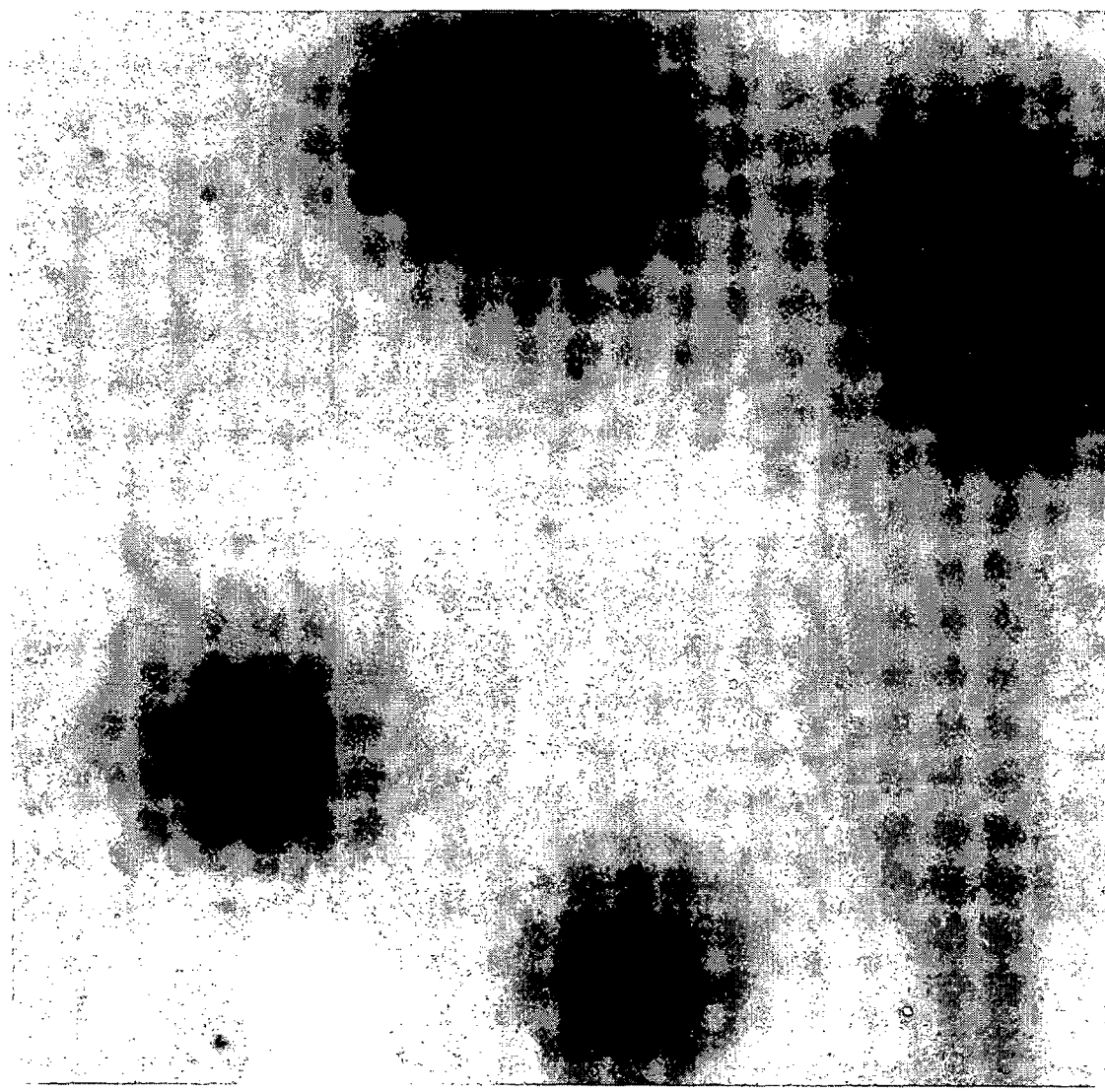
Figure 12. TEM (Transmission Electron Microscopy) photograph of particles from dispersion obtained in Example 34.

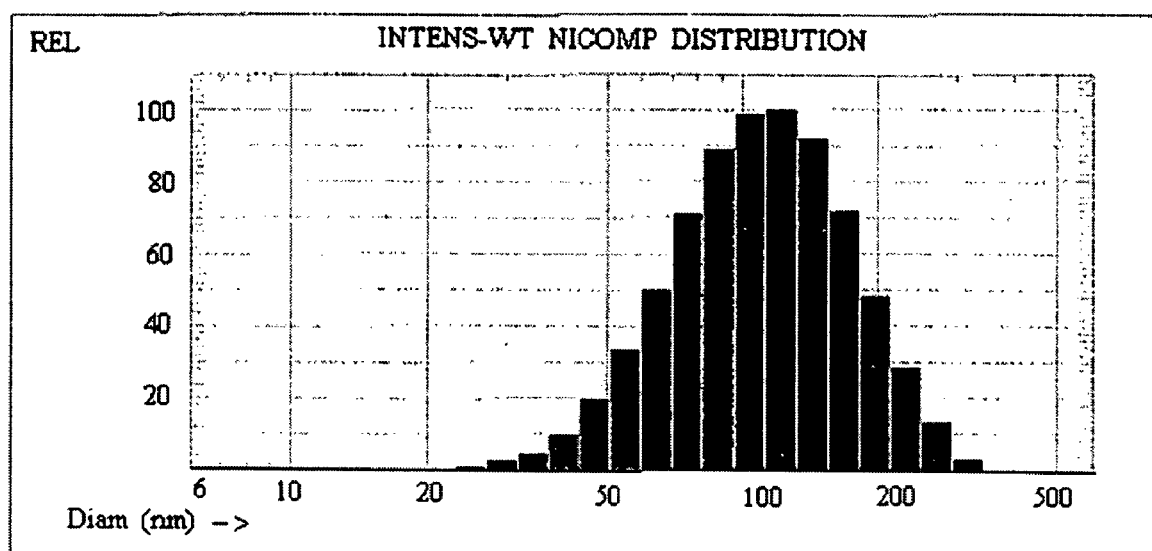
Figure 13. Particle size distribution of the dispersion from Example 1.

WATER DISPERSIONS OF NON-UNIFORM POLYURETHANE PARTICLES

CROSS-REFERENCE

This application claims priority of U.S. Provisional Application Ser. No. 60/484,430 filed on Jul. 2, 2003 and entitled "Non-Uniform, Water Dispersible Polyurethanes."

BACKGROUND

Polyurethanes, are widely used in various applications because of their good physical properties and the ability to prepare such resins in organic solvents, in bulk and, preferably, in aqueous medium. Much prior art exists dealing with various methods for producing aqueous polyurethane resins and polyurethane dispersions, but none appear to disclose a method of preparing water dispersible non-uniform, in particular core-shell polyurethanes.

Core-shell emulsion polymer particles are well known in the art but they deal primarily with radically polymerizable unsaturated monomers such as acrylates and vinyls. They are generally formed by a two-stage sequential emulsion polymerization process (see, for example, U.S. Pat. No. 6,479,147 (2002) and references cited therein). In the first stage, a monomer or a mixture of monomers are polymerized by a conventional emulsion polymerization technique forming a first-stage particle. In the second stage, a second mixture of polymerizable monomers and a polymerization catalyst are added to the first-stage emulsion to effect polymerization. In the second stage, the coating ("shell") around the first-stage particle ("core") is formed. If desired, multiple shells can be made over the same particle by sequential polymerizations. A similar approach is used to make polyurethane-acrylic hybrids as described in U.S. Pat. Nos. 4,644,030 and 5,137,961 only instead of the acrylic emulsion, a polyurethane dispersion is formed in the first stage.

U.S. Pat. No. 5,959,003 discloses that two diverse polyols are reacted with diisocyanates and two different amounts of hydrophilic group-containing dihydric alcohols to obtain a hydrophobic prepolymer and a hydrophilic prepolymer respectively. The two prepolymers are then dispersed in water together but in separate streams (not mixed prior to dispersion) and purportedly core-shell aqueous polyurethane particles are thus claimed to be formed due to the different hydrophilicity of the two prepolymers. In fact as is demonstrated, true core-shell morphology is not obtained by the process disclosed in this patent.

U.S. Pat. No. 6,017,998 discloses a stable one-component aqueous polyurethane dispersion comprising the reaction product of (a) at least one water dispersible isocyanate-terminated polyurethane prepolymer (A); (b) at least one aqueous polyurethane dispersion (B) comprising active hydrogen atoms; and (c) water. It is stated that the reaction product is in the form of at least one of the structures selected from a grafted polymer, an interpenetrating network (IPN), a core/shell structure and mixtures thereof. The prepolymer (A) is a reaction product of (i) at least one polyisocyanate; (ii) at least one hydroxyl carboxylic acid; (iii) at least one polymeric polyol; and (iv) optionally, at least one sulfonated polyol. The aqueous polyurethane dispersion (B) is the reaction product of (i) at least one isocyanate terminated polyurethane prepolymer (B); (ii) at least one amine chain extender; (iii) alcoholamine chain terminator; and, optionally, (iv) water. The polyurethane prepolymer (B) is based on at least one different polyisocyanate, or at least one different polymeric polyol, or based on a different ratio of polyisocyanate/polyol as compared with those of polyurethane prepolymer (A). Said patent discloses that the polyurethane dispersion is prepared by dispersing the isocyanate-terminated polyurethane prepolymer (A) in the aqueous dispersion of polyurethane (B).

According to the process disclosed in the above-noted patent, one component is already made into a stable dispersion. In such a dispersion, particles are colloidally stable due to the double electric layer and/or steric hindrance, which prevent their flocculation, and the particles have inherent resistance to coalescence with other particles. The water creates a barrier between the prepolymer A and dispersion particles B. Therefore, the final product will be a rather heterogeneous mixture of different types of particles, such as (1) pure particles A, (2) pure particles B, and (3) hybrid particles A+B (if any). This is supported by Figure B of the cited patent, where the object of invention contains five separate populations of the particles different in their particle sizes.

The present invention overcomes the above-mentioned obstacle by intimately pre-mixing the two or more prepolymers before the dispersion step. Thus, more uniform particles are formed and the population of hybrid particles (containing prepolymers A and B) is greatly increased to at least above about 50% of the total weight of particles.

BRIEF DESCRIPTION OF THE DRAWINGS

FIG. 1. Relationship between interfacial surface tensions and particle morphology.

FIG. 2. Examples of particle morphologies.

FIG. 3. The dynamics of phase separation during the formation of core-shell particles.

FIG. 4. Transmission Electron Microscopy (TEM) photograph of core-shell particles with brominated shell from Example 1.

FIG. 5. TEM photograph of polyester core/polycarbonate shell particles from Example 2 with cesium hydroxide staining.

FIG. 6. TEM photograph of particles from Comparative Example 3 with cesium hydroxide staining.

FIG. 7. Cryogenic Scanning Electron Microscopy (CryoSEM) image of core-shell particle with 30% rubbery core (HNA/IPDI) and 70% hard shell (PPG/Des W) from Example 4.

FIG. 8. CryoSEM image of core-shell particle with 70% core (HNA/IPDI) and 30% shell (PPG/Des-W) from Example 5.

FIG. 9. TEM image of "ice-cream cone" particles with 20% core (CAPA/Desmodur W) and 80% shell (PPG/IPDI) from Example 6.

FIG. 10. TEM photograph of particles from dispersion obtained in Example 32.

FIG. 11. TEM photograph of particles from dispersion obtained in Example 33.

FIG. 12. TEM photograph of particles from dispersion obtained in Example 34.

FIG. 13. Particle size distribution from the dispersion of Example 1.

SUMMARY OF THE INVENTION

In the broadest sense, the present invention is directed to a water dispersion of a blend of two or more different isocyanate-terminated polyurethane prepolymers and a method of its preparation which comprises (a) preparing at least two different isocyanate-terminated polyurethane prepolymers; (b)

mixing said prepolymers to form a uniform mixture; and (c) dispersing said mixture of prepolymers in an aqueous medium.

Another important aspect of the present invention is directed to a method of preparing a water dispersion of non-uniform polyurethane particles which comprises (a) preparing at least two isocyanate-terminated polyurethane prepolymers having different hydrophilicities; (b) preparing a mixture of said prepolymers; (c) optionally neutralizing the prepolymers and (d) dispersing the mixed prepolymers in an aqueous medium. The resulting dispersion of the prepolymers may optionally be chain extended.

Another aspect of the invention is the preparation of two prepolymers with different hydrophilicities achieved through the use of different levels of carboxylic acid or salt containing components. The two resulting prepolymers will possess different acid numbers.

Another aspect of the invention is a composition comprising a water dispersion of non-uniform polyurethane particles primarily of core-shell morphology.

A still further aspect of the invention is a composition comprising a water dispersion of non-uniform polyurethane particles primarily of gradient morphology, that is, wherein the composition of the particles gradually changes from the hydrophobic center to the hydrophilic surface of the particle.

Another aspect of the invention is a composition comprising a water dispersion of non-uniform polyurethane particles primarily of "raspberry" morphology wherein the continuous phase of the particle is primarily one composition and imbedded therein are individual particles of another composition. The two compositions making up the particles differ in hydrophilicities and/or in isocyanates, polyols and chain extenders used.

A further aspect of the invention is a composition comprising a water dispersion of non-uniform polyurethane particles primarily of interpenetrating network morphology wherein there are two co-continuous phases of two different compositions creating an entangled network. The two compositions making up the particles differ in hydrophilicities and/or in isocyanates and/or isocyanate reactive compounds.

A still further aspect of the invention is a composition comprising a water dispersion of non-uniform polyurethane particles primarily of "salt-and-pepper" morphology wherein the particles are composed of two different compositions that are in separate phases or domains. The two compositions making up the particles differ in hydrophilicities and/or in the types of isocyanates and polyols used to make the prepolymers and even in the types of chain extenders employed.

Still another aspect of the invention is a composition comprising a water dispersion of non-uniform polyurethane particles primarily of "ice-cream cone" morphology wherein two or more particles of different compositions, having different hydrophilicities, are joined or merged together, and sharing a surface of contact that may be large or small.

Other morphologies that the particles may possess are "lobed" morphology, interpolymer morphology or "hairy particles" with hydrophilic chains attached to the particle surface.

A still further aspect of the invention is a water dispersion of non-uniform polyurethane particles containing a combination of two or more morphologies mentioned above. Some of the morphologies discussed above are illustrated in FIGS. 1 and 2.

DETAILED DISCLOSURE

The most important aspects of the unique process of the present invention are (1) the separate preparation of at least two different isocyanate-terminated polyurethane prepolymers and (2) mixing of the prepolymers essentially in the absence of water to form a uniform (as defined below) mixture of the prepolymers before dispersing them in water. The difference between the prepolymers may be based on the use of different reactants, such as different polyisocyanates or different isocyanate-reactive compounds and, most importantly, the difference may be based on different hydrophilicities of the prepolymers as discussed in greater detail below. To illustrate the use of different reactants for preparing different prepolymers, the reactants may be selected from the group consisting of aromatic isocyanates, aliphatic isocyanates, araliphatic isocyanates, polyether polyols, polyester polyols, polycarbonate polyols, polyacetal polyols, polycaprolactone polyols, alkylene glycols, acrylate polyols, silicone polyols, halogenated polyols, polyamide polyols, polythiol esters, polyamines, polysulfides, polysulfone amides or even different chain extenders.

The unique nature of the present invention is a versatile new process that enables the preparation of an aqueous dispersion of polyurethane having primarily non-uniform particles of a desired structure and morphology, for example either primarily of core-shell morphology or primarily of gradient morphology or a combination of core-shell and gradient morphologies or of other morphologies described in the present invention. By "non-uniform" is meant that the composition of a particle is not of the same or similar composition throughout the particle, but various parts of the particle have substantially different compositions, such as in a core-shell morphology.

By "primarily" is meant that at least about 50% of the particles in the dispersion are non-uniform and if referred to a particular morphology, that at least about 50% of the particles by weight in the dispersion contain the specified morphology. Thus, if the dispersion contains primarily core-shell particles, this means that at least about 50% of the particles in the dispersion are of the core-shell morphology. It is preferable that the polyurethane dispersion of this invention actually contain a higher percentage of non-uniform particles or of a specific morphology, such as 60% or 70% and most preferably, at least 80%. In some instances, it is possible to prepare polyurethane dispersions containing 90% or even higher of non-uniform particles.

In one important aspect of the present invention, in which core-shell particles are produced, the core is made up primarily of a more hydrophobic polyurethane while the shell is made up primarily of a more hydrophilic polyurethane. To obtain a true core-shell morphology, the two prepolymers must have substantially different hydrophilicities. In other words, one prepolymer must be relatively hydrophobic and the other relatively hydrophilic. The greater the difference in hydrophilicities, the more distinct and clear cut separation between the core and the shell phases will be. Such particles are referred to as being non-uniform because there is no uniformity in the composition throughout the particle.

The type of particles prepared by the method of this invention is not limited to core-shell only. Additionally, the particles may have an intermediate layer between the core and the outer shell layers, or even two or three intermediate layers. It may also be possible to prepare particles that may have a combination of distinct layers and gradient layers, such as having a core and a gradient outside layer, or a core, a gradient layer and a distinct outside shell layer and so on. To prepare particles that contain a gradient layer, it is preferred to have prepolymers that do not vary greatly in hydrophilicity from each other. The above described morphologies of particles are also novel and unique for polyurethane compositions and can be prepared by the method of this invention.

When the prepolymers differ in ways other than by hydrophilicity or acid numbers, the particles obtained from a mixture of such prepolymers are less likely to have a core-shell morphology. The resulting particles may have a salt-and-pepper morphology, an interpenetrating network morphology or raspberry morphology because there is no hydrophilicity gradient across the particles.

Although it is difficult to predict what particular morphology will result from a specific experiment, some general guidelines can be offered to direct experimentation towards a desired morphology. There are two key competing processes occurring simultaneously during the morphology development (during dispersion of the prepolymer and mixing of the dispersion but before extension):

1) Diffusion of hydrophilic components to the water-particle interface and migration of hydrophobic components into the middle of the particle,
2) Phase separation of the two (or more) components due to their thermodynamic incompatibility.

The relative rates of these two processes and their duration will determine, to a large extent, the morphology of the particles.

The following factors will increase the overall diffusion rate:
  Lower molecular weights
  Narrow molecular weight distributions
  Higher temperature
  Lower viscosity
  Flexible backbone
  Presence of low-molecular weight diluents (solvents, plasticizers, reactive monomers, etc.)
  Electron donors and some ionic additives can disrupt the hydrogen bonding On the other hand, the following will slow down the diffusion:
  Specific interactions between components (hydrogen bonding, dipole-dipole interaction, complexation, etc.)
  Branching
  Rigid backbone
  Grafting of the two phases
  Spontaneous chain extension with water will increase the prepolymer molecular weight and therefore slow down the diffusion The phase separation can be accelerated by the following:
  Different chemical nature of the polyols and isocyanates used
  Higher difference in hydrophilicity/hydrophobicity of the two phases
  Spontaneous chain extension with water will increase the prepolymer molecular weight and can induce incompatibility and phase separation On the other hand, the following will inhibit the phase separation:
  Low molecular weight diluents (see above), which are good solvents for both components
  Incomplete reaction during the formation of prepolymers: If the reaction continues after mixing of the two prepolymers, compatibilizing cross-species can be formed
  Specific interaction and complex formation between the two prepolymers As one can see, some factors play different roles in both diffusion and phase separation further complicating the ability to predict with certainty the exact particle morphology that will result. Consequently, some experimentation may be required to determine which reactants or reaction or mixing conditions should be used to obtain the desired morphology of the particles.

Generally, it is preferable to have compatible (miscible) prepolymers to ensure their intimate mixture and, as a result, a uniform dispersion comprised of the particles with essentially the same morphology. The preferred driving force for the morphology development is the difference in hydrophilicity. This, however, is not the only route to achieve the phase separation. The immiscibility of the two (or more) prepolymers can be induced at the dispersion step and/or during extension and/or thereafter. The following additional factors can reasonably be anticipated to promote phase separation:

Increase in molecular weight. Polymers are generally more incompatible than monomers or oligomers. Therefore, the increase of the molecular weight during chain extension can augment the difference between the prepolymers and induce phase separation.

Temperature change. In standard practice of making polyurethane dispersions, prepolymers at a higher temperature are added to cooler water in order to avoid excessive reaction of NCO with water. Prepolymers, which are compatible at a higher temperature, can phase separate upon cooling to a lower temperature in dispersion.

Solvent extraction. If a solvent is used in the prepolymer formation step, it can act as a compatibilizer of otherwise incompatible prepolymers. During and after the dispersion step, the solvent can be extracted from the particles into the water phase, if the solvent has some water solubility (e.g., acetone, NMP, etc.), and thus trigger phase separation.

Crystallinity. If one prepolymer has higher propensity to crystallize, it can phase separate due to crystallization after chain extension.

Selective water plasticization. Water can selectively plasticize one of the prepolymers and induce thermodynamic incompatibility between the prepolymers.

Selective or preferential neutralization. If only one prepolymer contains a non-neutralized acid or different prepolymers contain different acids, then selective or preferential neutralization can cause incompatibility and phase separation.

The dynamics of diffusion and phase separation during the core-shell formation is shown on FIG. 3 using an example of 1:1 mixture of component A (hydrophobic core) and B (hydrophilic shell). It starts with a uniform mixture of oligomers (trace U). When the prepolymer mixture is dispersed into water, the diffusion sets in and the system goes through a continuum of gradient morphologies ($G_1 \rightarrow G_2 \rightarrow G_3$). At a certain point in time, a distinct core and/or shell is formed with a transitional interlayer (trace $C_1$). Ultimately, the transitional interlayer shrinks and disappears and a perfect core-shell particle is formed with a distinct phase separation between the core and the shell (trace C).

One can easily imagine some mixed cases, such as a combination of linear and non-linear gradients together with phase separation and the like. Also the plot of fraction B versus distance from the particle center does not have to (and most likely will not) pass through the (0.5, 0.5) coordinate. FIG. 3 shows only a simplified case.

The particle size can have a significant impact on the final morphology of the particles. For smaller particles, the diffusion path of a hydrophilic component to the surface of the particle and for a hydrophobic component to the center of the particle is shorter. Therefore, it is easier to make perfect core-shell morphology when the particle size is smaller. For larger particles, a more complex morphology is expected with possibly several morphologies co-existing within the same particle, as shown in FIG. 8.

Any of the intermediate morphologies can be "frozen" by chain extending the dispersion when the desired morphology is reached. The chain extension will result in an abrupt molecular weight increase which in turn will lead to a jump in the intrinsic viscosity of the particle. Diffusion will dramatically slow down and the morphology will be more likely to become fixed.

One also has to consider the interfacial surface tension between the three phases: water and prepolymer A, water and prepolymer B, prepolymer A and prepolymer B. Nature will move the system in the direction of minimizing its total energy which is comprised of the three components:

$$E_{total} = S_{AW} * \sigma_{AW} + S_{BW} * \sigma_{BW} + S_{AB} * \sigma_{AB}$$

where
$E_{total}$—total system energy
$\sigma_{AW}$—surface tension between water and phase A
$\sigma_{BW}$—surface tension between water and phase B
$\sigma_{AB}$—surface tension between phase A and phase B
$S_{AW}$—surface area between water and phase A
$S_{BW}$—surface area between water and phase B
$S_{AB}$—surface area between phase A and phase B FIGS. 1 and 2 show some morphologies which will likely be formed as a result of a particular interrelationship between the surface tensions. In general, the surface area with the highest interfacial surface tension will tend to reduce in size with a corresponding gain in surface area with the lowest surface tension so that the sum $E_{total}$ will decrease.

Based on the above considerations, some additional general guidelines can be suggested (see FIG. 2 for illustrations):

Faster diffusion and slower phase separation will favor ideal core-shell morphology.

Slower diffusion and faster phase separation will favor the morphologies like "raspberry", "salt-and-pepper", interpenetrating network.

Slower diffusion and slower phase separation (as compared with the duration of the process) will favor the formation of gradient particles.

It may be necessary to experiment to determine how best to prepare particles of desired morphologies. When a dispersion is made from a mixture of prepolymers of different hydrophilicities, for example, diffusion and phase separation occurs within a particle as mixing continues. It is a dynamic process which depends on time, temperature of the mixed prepolymers and water and the amount of diluents present. The degree of phase separation depends on time and the viscosities of the prepolymers. With longer mixing the phase separation is more pronounced. Thus, to obtain core-shell particle morphology, it could be necessary to mix the dispersion for a longer period of time. Initially the phases are not well separated and for this reason it is possible to obtain particles containing gradient type of morphology, even if the prepolymers differ substantially in hydrophilicity. With continued mixing, it is likely that morphologies will change from gradient to raspberry to interpenetrating network and eventually to core-shell if the hydrophilicities of the prepolymers are sufficiently different. It should also be kept in mind that with time, as mixing is continued, available isocyanate groups will react with water, some chain extension will occur with the resulting increase in molecular weight and increased viscosity. It is possible to freeze a particular morphology at any time during the dispersion formation by adding a chain extender.

The number average particle size of the polyurethanes of the present invention is in the range from about 20 nm to about 50 microns, preferably from about 20 nm to 3 microns, and for making stable dispersions from about 20 nm to about 600 nm.

The steps employed in the process of this invention are well known and generally employed in the preparation of polyurethane dispersions, but the unique combination of preparing specific types of prepolymers as defined below and a specific manner of combining the prepolymers enables the preparation of polyurethane dispersions containing particles with the above described morphologies. Premixing polyurethane prepolymers, as employed in this invention, has not been practiced in the art involving the preparation of polyurethane dispersions.

At least two different polyurethane prepolymers must be prepared. Generally each prepolymer is prepared separately, although they may be prepared in the same reactor under certain conditions as discussed below. The prepolymers may differ in various respects: they may differ by having different hydrophilicities or crystallinities; they may differ by the use of different polyols, isocyanates, chain extenders, crosslinkable agents, water-dispersibility enhancing compounds, blocking agents, neutralizing agents, reactive diluents, monomers, plasticizers, branching agents, molecular weights, NCO to OH ratios, solvents, surfactants, flame retardants and other additives such as oxidation inhibitors, UV stabilizers, biocides and biostats and other differences mentioned herein.

Differences in hydrophilicities in prepolymers is most important and preferred because it enables one to make non-uniform particles, especially core-shell or gradient particles. Hydrophilicity may be measured in different ways, such as by weight percent of hydrophilic component (anionic, cationic, amphoteric and nonionic), equivalents of hydrophilic component per gram polymer, acid number and so forth. If nonionic hydrophilic groups, such as ethylene oxide, are present, the differences in hydrophilicity may be expressed by weight percent of ethylene oxide units, either in the side chain or in the backbone, per polymer dry weight. For the cationically stabilized dispersions, hydrophilicity can be expressed in the equivalents of cationic or cationogenic groups per gram polymer dry weight.

Another way to achieve different hydrophilicities is for the prepolymers to have different acid numbers. Acid number is defined as the weight of potassium hydroxide in milligrams that is needed to neutralize 1 gram of polymer on a dry weight basis. If neutralized acid is used, then acid number is determined before the neutralization.

If true core-shell particles are desired, a preferred method is to employ two prepolymers having a substantial difference in hydrophilicities, or acid numbers. One prepolymer must have a lower acid number, such as from 0 to 15, preferably from 0 to 10 and more preferably from 0 to 5. The other prepolymer should have a higher acid number, that is, above about 15, usually from just above about 15 to 100, preferably from about 25 to 80 and more preferably from about 35 to 60. The two prepolymers preferably differ in acid numbers by at least 10. In other words, the prepolymer having a low acid number will be relatively less hydrophilic and, therefore, could be characterized as a hydrophobic prepolymer, which will form the core. The prepolymer having a higher acid number will be relatively more hydrophilic and, therefore, could be characterized as hydrophilic and will form the outer shell.

The polyurethane prepolymers are prepared using well known methods for the preparation of polyurethanes, that is, by reacting at least one polyisocyanate with at least one isocyanate-reactive compound (i.e., active hydrogen-containing compound) to form an isocyanate prepolymer (see D. Dieterich, *Progress in Organic Coatings*, 9, 281 (1981)).

The chain-extended prepolymer compositions of the present invention are conveniently referred to as polyurethanes because they contain urethane groups. It is well understood by those skilled in the art that "polyurethanes" is a generic term used to describe polymers obtained by reacting isocyanates with at least one hydroxyl-containing compound, amine containing-compound, or a mixture thereof. Actually, urethane linkages are formed when an isocyanate group reacts with an alcohol (polyol), but when both polyols and polyamines are used as the active hydrogen-containing compounds, they can be more accurately described as poly(urethane/urea)s. It also is well understood by those skilled in the art that polyurethanes also include allophanate, biuret, carbodiimide, oxazolidinyl, isocyanurate, uretdione, and other groups in addition to urethane and urea linkages.

As used herein, the term "wt. %" means the number of parts by weight of monomer per 100 parts by weight of polymer, or the number of parts by weight of a particular ingredient per 100 parts by weight a composition.

Polyisocyanates

The polyisocyanates useful in preparing isocyanate-terminated polyurethane prepolymers have an average of at least one, preferably about two or more isocyanate groups, preferably an average of about two to about four isocyanate groups and include aliphatic, cycloaliphatic, araliphatic, and aromatic polyisocyanates, used alone or in mixtures of two or more. Diisocyanates are more preferred. Certain levels of monofunctional isocyanates can be used, as desired, for example to control the molecular weight or to introduce other functional groups, such as alkoxy silanes and ethylene urea.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like, derivatives of the aforementioned isocyanates and their mixtures. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, isophorone diisocyanate, 1,4-cyclohexane diisocyanate, 1,3-bis-(isocyanatomethyl) cyclohexane, and the like, derivatives of the aforementioned isocyanates and their mixtures. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like, derivatives of the aforementioned isocyanates and their mixtures. A preferred araliphatic polyisocyanate is tetramethyl xylylene diisocyanate.

Examples of suitable aromatic polyisocyanates include methane-bis-(4-phenylene isocyanate), toluene diisocyanate, their isomers, naphthalene diisocyanate, toluene diisocyanate dimmer, phenylene diisocyanate dimer, and the like, derivatives of the aforementioned isocyanates and their mixtures. Preferred aromatic polyisocyanates are toluene diisocyanate and methane-bis-(4-phenyl isocyanate).

Isocyanate-Reactive Compounds

The term "isocyanate reactive compounds" refers to compounds that are a source of active hydrogen and that can react with isocyanate groups via the following reaction: —NCO+ H—X→—NH—C(=O)—X to form urethane or other groups. Sometimes they are also referred to as "active-hydrogen containing compounds". Such compounds typically range widely in molecular weight from about 18 to about 10,000 Daltons. Such compounds can be losely divided into two categories: polyols and chain extenders. Chain extenders are compounds having molecular weight below 500 Daltons which are described in greater detail below. The "polyols" are compounds having a number average molecular weight above about 500, preferably about 500 to about 6,000 Daltons and more preferably 500 to 3000 Daltons. Examples of suitable active hydrogen containing compounds include but are not limited to polyols, polythiols or mercaptans, polyamines, and compounds with mixed fuctionalities.

The term "polyol" denotes any relatively high molecular weight product, typically referred to as a long-chain polyol, which has an active hydrogen that can be reacted with isocyanates and includes materials having at least one, preferably an average of about two or more hydroxyl groups per molecule. Such long-chain polyols that can be used in the present invention include higher polymeric polyols such as polyester polyols and polyether polyols, as well as polyhydroxy polyester amides, hydroxyl-containing polycaprolactones, hydroxyl-containing acrylic and vinyl polyols, hydroxyl-containing epoxies, polyalkylene ether polyols, polyhydroxy polycarbonates, polyhydroxy polyacetals, polyhydroxy polythioethers, polysiloxane polyols, ethoxylated polysiloxane polyols, polybutadiene and hydrogenated polybutadiene polyols, long alkyl chain polyols, dimerate polyols, halogenated polyols, polyacrylates polyols, polymethacrylate polyols, polyvinyl polyols, ethoxylated bis-phenol-A, and the like, their derivatives and mixtures thereof. The polyester polyols, polyether polyols, and polycarbonate polyols are preferred for the main part of polyurethane composition. Other polyols are generally, although not exclusively, used in the form of additives, i.e., at lower levels.

The polyester polyols typically are esterification products prepared by the reaction of organic polycarboxylic acids and/or their anhydrides with a stoichiometric excess of a diol or diols. Examples of suitable polyols for use in the reaction include polyglycol adipates, polyglycol isophthalates, polyethylene terephthalate polyols, polycaprolactone polyols, carboxylated polycaprolactone, polyols, orthophthalic polyols, sulfonated polyols, phosphonated polyols, and the like, their derivatives and mixtures thereof.

The diols used in making the polyester polyols include alkylene glycols, e.g., ethylene glycol, 1,2- and 1,3-propylene glycols, 1,2-, 1,3-, 1,4-, and 2,3-butylene glycols, hexane diols, neopentyl glycol, 3-methyl-1,5-pentanediol, 1,6-hexanediol, 1,8-octanediol, and other glycols such as bisphenol-A, cyclohexane diol, cyclohexane dimethanol (1,4-bis-hydroxymethylcycohexane), diethylene glycol, 2-methyl-1,3-propanediol, 2-butyl-2-ethyl-1,3-propanediol, 2,2,4-trimethyl-1,3-pentanediol, triethylene glycol, tetraethylene glycol, polyethylene glycol, dipropylene glycol, polypropylene glycol, dibutylene glycol, polybutylene glycol, caprolactone diol, dimerate diol, hydroxylated bisphenols, polyether glycols, naphthalene and other aromatic diol, halogenated diols, and the like, their derivatives and mixtures thereof. Preferred diols include ethylene glycol, butylene glycol, hexane diol, neopentyl glycol and cyclohexane dimethanol. The same compounds can be used as chain extenders in making prepolymers as described above.

Suitable carboxylic acids used in making the polyester polyols include dicarboxylic acids and tricarboxylic acids and anhydrides, e.g., maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, naphthalene dicardoxylic acid, fumaric acid, dimeric fatty acids such as oleic acid and hydrogenated dimeric fatty acids, 2-phosphonobutane-1,2,4-tricarboxylic acid and the like, their derivatives and mixtures thereof. Preferred polycarboxylic acids used in making the polyester polyols include aliphatic or aromatic dibasic acids.

The preferred polyester polyol is a diol. Preferred polyester diols include hexane diol neopentyl glycol adipic acid polyester diol, e.g., Piothane 67-3000 HNA (Panolam Industries) and Piothane 67-1000 HNA.

Polyether polyols may be substituted in whole or in part for the polyester diols. Polyether polyols are obtained in known manner by the reaction of (A) the starting compounds that contain reactive hydrogen atoms, such as water or the diols set forth for preparing the polyester polyols, and (B) alkylene oxides, such as ethylene oxide, propylene oxide, butylene oxide, isobutylene oxide, styrene oxide, tetrahydrofuran, epichlorohydrin, and mixtures thereof. The polyether polyols can be random or block copolymers. Preferred polyethers include polypropylene glycol and poly(1,4-butanediol).

Polycarbonates contain —O—C(=O)—O— group and include those obtained from the reaction of (A) diols such 1,3-propanediol, 1,4-butanediol, 2-methyl-1,3-propane diol, 3-methyl-1,5-pentane diol, 1,6-hexanediol, diethylene glycol, triethylene glycol, tetraethylene glycol, cyclohexane dimethylol, and the like, and mixtures thereof with (B) diarylcarbonates such as diphenylcarbonate or phosgene.

Polyacetals include the compounds that can be prepared from the reaction of (A) aldehydes, such as formaldehyde and the like, and (B) glycols such as ethylene glycol, diethylene glycol, triethylene glycol, ethoxylated 4,4'-dihydroxy-diphenyldimethylmethane, 1,6-hexanediol, 3-methyl-1,5-pentanediol, and the like. Polyacetals can also be prepared by the polymerization of cyclic acetals.

The aforementioned diols useful in making polyester polyols can also be used as additional reactants to prepare the isocyanate terminated prepolymer.

Instead of a long-chain polyol, a long-chain amine may also be used to prepare the isocyanate terminated prepolymer. Suitable long-chain amines include polyester amides and polyamides, such as the predominantly linear condensates obtained from reaction of (A) polybasic saturated and unsaturated carboxylic acids or their anhydrides, and (B) polyvalent saturated or unsaturated aminoalcohols, diamines, polyamines, and mixtures thereof.

Diamines and polyamines are among the preferred compounds useful in preparing the aforesaid polyester amides and polyamides. Suitable diamines and polyamines include 1,2-diaminoethane, 1,6-diaminohexane, 2-methyl-1,5-pentanediamine, 3-methyl-1,5-pentanediamine, 2,2,4-trimethyl-1,6-hexanediamine, 1,12-diaminododecane, 2-aminoethanol, 2-[(2-aminoethyl)amino]-ethanol, piperazine, 2,5-dimethylpiperazine, 1-amino-3-aminomethyl-3,5,5-trimethyl-cyclohexane (isophorone diamine or IPDA), bis-(4-aminocyclohexyl)-methane, bis-(4-amino-3-methyl-cyclohexyl)-methane, 1,4-diaminocyclohexane, 1,2-propylenediamine, hydrazine, urea, amino acid hydrazides, hydrazides of semicarbazido-carboxylic acids, bis-hydrazides and bis-semicarbazides, diethylene triamine, triethylene tetramine, tetraethylene pentamine, pentaethylene hexamine, N,N,N-tris-(2-aminoethyl) amine, N-(2-piperazinoethyl)-ethylene diamine, N,N'-bis-(2-aminoethyl)-piperazine, N,N,N'tris-(2-aminoethyl)ethylene diamine, N—[N-(2-aminoethyl)-2-aminoethyl]-N'-(2-aminoethyl)-piperazine, N-(2-aminoethyl)-N'-(2-piperazinoethyl)-ethylene diamine, N,N-bis-(2-aminoethyl)-N-(2-piperazinoethyl) amine, N,N-bis-(2-piperazinoethyl)-amine, polyethylene imines, iminobispropyl-amine, guanidine, melamine, N-(2-aminoethyl)-1,3-propane diamine, 3,3'-diaminobenzidine, 2,4,6-triaminopyrimidine, polyoxypropylene amines, tetrapropylenepentamine, tripropylenetetramine, N,N-bis-(6-aminohexyl) amine, N,N'-bis-(3-aminopropyl)ethylene diamine, and 2,4-bis-(4'-aminobenzyl)-aniline, and the like, and mixtures thereof. Preferred diamines and polyamines include 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, ethylene diamine, diethylene triamine, triethylene tetramine, tetraethylene pentamine, and pentaethylene hexamine, their derivatives and mixtures thereof. Other suitable diamines and polyamines include Jeffamine® D-2000 and D-4000, which are amine-terminated polypropylene glycols, differing only by molecular weight, and which are available from Huntsman Chemical Company. The above compounds can also be used as chain extenders.

Thiols or mercaptans may also be employed as isocyanate-reactive compounds. The useful thiols include aliphatic thiols, cycloaliphatic thiols, aromatic thiols, aromatic and araliphatic thiols and heterocyclic thiols. Useful mercaptans include polythiol compounds that have at least one, preferably two or more thiol groups.

A polyol containing a hetero atom, that is, an atom other than hydrogen, carbon and oxygen, may also be employed. Examples of such polyols are silicone polyols, halogenated polyols, phosphazine polyols, azine polyols and others.

Silicone polyols may be used as isocyanate-reactive compounds. Silicone polyols, however, are often incompatible with other polyols, especially the higher molecular weight silicones. Those silicones that are substantially compatible with other polyols may be used as the only isocyanate-reactive compound or they may be used in any ratio with one or more other isocyanate-reactive compound. However the silicone polyols that are incompatible, preferably should be used in the amount of up to about 20% or above about 75% by weight of the total amount of the isocyanate-reactive compound, unless compatibilizing agent(s), such as a solvent, is used.

Examples of suitable silicone polyols are KF-6001, KF-6002, X-22-160AS from Shin Etsu, Y-14209 from GE Silicone all of which are oligomeric polysiloxanes with reactive alcohol groups having different molecular weights. A more extensive list of suitable silicone polyols is disclosed in U.S. Pat. No. 6,313,335 which is incorporated herein by reference.

Silicones impart to the resulting polyurethanes different surface properties such as coefficient of friction, stain removal properties and adhesion properties. Gloves coated with such polymers can be made to easily don (slip) on a hand. Polyurethanes containing silicones may be employed to modify other polymers if it is desired to lower the coefficient of friction, reduce tack and blocking, increase abrasion resistance or impart water repellency, for example.

Halogenated polyols, such as fluorinated, chlorinated and brominated polyols, may be used as isocyanate-reactive compounds. Examples include fluorinated polyols such as Polyfox® polyols (trademark of Aerojet-General). Other examples may be found in U.S. Pat. No. 6,313,335 which is incorporated herein by reference.

Acrylic, methacrylic, vinyl styrenic, polybutadiene, nitrile and polyisobutylene polyols may be employed as isocyanate-reactive compounds. Examples of such compounds may be illustrated by Tego™ diols from Goldschmidt Chemical such as polymethyl methacrylate diol and polybutyl methacrylate diol.

Water-Dispersibility Enhancing Compounds

A water-dispersibility enhancing compound is often employed to make the generally hydrophobic polyurethanes water dispersable. In one aspect of the present invention, at least one polyurethane prepolymer preferably should be relatively more hydrophilic. Consequently, the water-dispersibility enhancing compound would generally be incorporated in the hydrophilic type prepolymer, although it may also be incorporated in the relatively hydrophobic prepolymer, especially if particles of gradient composition are desired.

The water-dispersibility enhancing compounds have at least one hydrophilic ionic, potentially ionic, or nonionic group whose optional presence in the polymer assists dispersion of the polyurethane in water and enhances stability of the dispersions. Typically a compound bearing at least one hydrophilic group or a group that can be made hydrophilic (e.g., by chemical modifications such as neutralization) is incorporated into the polymer chain. These groups can be incorporated into the polymer through the isocyanate and/or isocyanate-reactive compounds, or they can be grafted onto the polymer chain.

The water-dispersibility enhancing compounds can be grouped into four general categories according to the charge they bear: Anionic (negatively charged), cationic (positively charged), zwitterionic (bearing both negative and positive charges), and nonionic (uncharged).

Examples of anionic groups include carboxylic, sulfonate, sulfate, phosphonate, and phosphate groups.

Anionic groups such as carboxylic acid groups can be incorporated into the prepolymer in an inactive form and subsequently activated by a salt-forming compound, such as a tertiary amine defined more fully hereinafter, in order to create a prepolymer having an acid number from about 6 to about 80.

The preferred carboxyl groups for incorporation into the isocyanate-terminated prepolymer are derived from hydroxy-carboxylic acids having the general formula $(HO)_xQ(COOH)_y$, wherein Q is a straight or branched hydrocarbon radical containing 1 to 12 carbon atoms, and x and y are independently 1 to 3. Examples of such hydroxy-carboxylic acids include citric acid, dimethylolpropanoic acid (DMPA), dimethylol butanoic acid (DMBA), glycolic acid, lactic acid, malic acid, dihydroxymalic acid, tartaric acid, and the like, and mixtures thereof. Dihydroxy-carboxylic acids are more preferred with dimethylolpropanoic acid and dimethylol butanoic acid being most preferred.

Other suitable water-dispersibility enhancing compounds include thioglycolic acid, 2,6-dihydroxybenzoic acid, sulfoisophthalic acid, 2-[(2-aminoethyl)aminol]ethane sulfonic acid, and the like, their salts and derivatives and mixtures thereof.

Nonionic water-dispersibility enhancing compounds can also be reacted into the prepolymer backbone through urethane linkages or urea linkages, including lateral or terminal hydrophilic ethylene glycol, methylvinylether, ureido or other water-soluble units. Hydrophilic poly(alkylene oxide) side chains can be incorporated into polyurethanes by methods well known to those skilled in the art. For example, active hydrogen-containing compounds having poly(alkylene oxide) side chains include diols having poly(ethylene oxide) side chains such as those described in U.S. Pat. No. 3,905,929 (incorporated herein by reference in its entirety). Further, U.S. Pat. No. 5,700,867 (incorporated herein by reference in its entirety) teaches methods for incorporation of poly(ethylene oxide) side chains at col. 4, line 35 to col. 5, line 45. A preferred active hydrogen-containing compound having poly (ethylene oxide) side chains is trimethylol propane monoethoxylate mether ether, available as Tegomer D-3403 from Degussa-Goldschmidt. Nonionic stabilization can be used in combination with anionic, cationic or zwitterionic stabilizations.

In place of anionic and nonionic water-dispersibility enhancing compounds, one can also use cationic or potentially cationic compounds. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or quaternization of corresponding nitrogen, phosphorous, or sulfur moieties. The combination of all of the above cationic groups can be used as well as their combination with nonionic stabilization. A preferred cationigenic compound is N-methyl diethanolamine.

The amount of water-dispersibility enhancing compound can be as high as up to about 60 wt. % and depends on its nature, but typically is from about 1 wt. % to about 40 wt. %, preferably from about 2 wt. % to about 30 wt. %, and more preferably from about 2 wt. % to about 20 wt. % based on the total weight of the prepolymer.

Although the use of the water-dispersibility enhancing compounds is desirable for the purpose of the present invention, because it assists with the hydrophilicity adjustment, it is not required. The dispersion step can be accomplished by the use of high shear in combination with stabilizing surfactants. In this case the difference in hydrophilicity can be achieved by the choice of other components in the prepolymers.

It is preferable, although not required for the purpose of the present invention, that the prepolymer not have a viscosity of over about 30,000 Centipoise (cP). This will facilitate the mixing, transferring, and handling of the prepolymer. If the viscosity is higher than desired, solvents, polymerizable monomers or plasticizers may be used. The acid content of the water-dispersibility enhancing compound, if present (along with ratio of NCO to active hydrogen as explained more fully below) is one consideration for producing a low viscosity prepolymer. Higher acid numbers will lead to higher viscosity. The viscosity will depend on the temperature and on the molecular weight of the prepolymer which should be controlled as necessary by the methods known to those skilled in the art such as, for example, molecular weight and chemical nature of polyols, NCO to OH ratio which controls the degree of polymerization, type of isocyanates and other.

Compounds with Crosslinkable Functional Groups

It may be advantageous to crosslink polyurethanes to improve or modify certain physical properties, such as tensile strength, modulus, chemical and abrasion resistance and others. Crosslinking may be accomplished during the formation of the prepolymers, during the dispersing stage or later, such as before or after casting a film. Compounds having at least one crosslinkable functional group may be used to crosslink polyurethanes. Such compounds include those having carboxylic, carbonyl, amine, hydroxyl, acetoacetoxy, vinyl, allyl, acrylic, methacrylic, tert-carbon and hydrazide groups, and the like, and mixtures of such groups. The typical amount of such optional compound is up to about 1 milliequivalent, preferably from about 0.05 to about 0.5 milliequivalent, and more preferably from about 0.1 to about 0.3 milliequivalent per gram of final polyurethane on a dry weight basis.

The preferred monomers for incorporation into the isocyanate-terminated prepolymer are hydroxy-carboxylic acids having the general formula $(HO)_x Q(COOH)_y$, wherein Q is a straight or branched hydrocarbon radical having 1 to 12 carbon atoms, and x and y are 1 to 3. Examples of such hydroxy-carboxylic acids include citric acid, dimethylolpropanoic acid (DMPA), dimethylol butanoic acid (DMBA), glycolic acid, lactic acid, malic acid, dihydroxymalic acid, tartaric acid, hydroxypivalic acid, and the like, and mixtures thereof. Dihydroxy-carboxylic acids are more preferred with dimethylolpropanoic acid (DMPA) being most preferred. Other suitable compounds providing crosslinkability include thioglycolic acid, 2,6-dihydroxybenzoic acid, dihydroxyacetone, trimethylolpropane monoacrylate, pentacrythritol triallyl ether, and the like, and mixtures thereof.

Surfactants

Surfactants are not required to carry out the method of this invention, but they may be advantageously used, especially during the formation of the dispersion to stabilize the particles to a greater extent. Suitable surfactants include a wide variety of nonionic, cationic, anionic, and zwitterionic surfactants, such as those disclosed in *McCutcheon's Detergents and Emulsifiers*, North American Edition (1986), Allured Publishing Corporation; and in U.S. Pat. Nos. 3,755,560, 4,421,769, 4,704,272, 4,741,855, 4,788,006, and 5,011,681. Examples of suitable surfactants include silicone esters, alkyl and alkenyl sulfates; alkyl and alkenyl ethoxylated sulfates (preferably having an average degree of ethoxylation from 1 to about 150); succinamate surfactants such as alkylsulfosuccinamates and dialkyl esters of sulfosuccinic acid; neutralized fatty acid esters of isethionic acid; and alkyl and alkenyl sulfonates, such as olefin sulfonates and beta-alkoxy alkane sulfonates; and the like. Preferred are alkyl and alkenyl sulfates and alkyl and alkenyl ethoxylated sulfates, such as the sodium and ammonium salts of C12-C18 sulfates and ethoxylated sulfates with a degree of ethoxylation from 1 to about 6, and more preferably from 1 to about 4, such as lauryl sulfate and laureth (3.0) sulfate sodium 3-dodecylaminopropionate; N-alkyltaurines such as prepared by reacting dodecylamine with sodium isethionate according to the teaching of U.S. Pat. No. 2,658,072; N-higher alkyl aspartic acids such as produced according to the teaching of U.S. Pat. No. 2,438,091; and the products sold under the trade name "Miranol" and described in U.S. Pat. No. 2,528,378; and the like. Other suitable surfactants include alkyl (preferably C6-C22 and more preferably C8-C12) amphoglycinates; alkyl (preferably C6-C22 and more preferably C8-C12) amphopropionates; and the like. Mixtures can also be used.

Suitable zwitterionic surfactants for use in the present compositions include those broadly described as derivatives of aliphatic quaternary ammonium, phosphonium, and sulfonium compounds, wherein the aliphatic radicals can be straight chain or branched, and wherein one of the aliphatic substituents contains from about 8 to about 18 carbon atoms and another substituent contains an anionic water-dispersibility enhancing group, such as carboxy, sulfonate, sulfate, phosphate, phosphonate, and the like. Classes of zwitterionics include alkyl amino sulfonates, alkyl betaines and alkyl amido betaines, stearamido propyl dimethyl amine, diethyl amino ethyl stearamide, dimethyl stearamine, dimethyl soyamine, soyamine, myristyl amine, tridecyl amine, ethyl stearylamine, N-tallowpropane diamine, ethoxylated stearylamine, dihydroxy ethyl stearylamine, arachidylbehenylamine, and the like. Mixtures can also be used. Such suitable surfactants typically comprise about 0.1 wt. % to about 25 wt. %, preferably about 0.5 wt. % to about 25 wt. %, and more preferably about 1 wt. % to about 15 wt. % of the total weight of the compositions of the present invention.

Catalysts

The formation of the isocyanate-terminated prepolymer may be achieved without the use of a catalyst. However, a catalyst is preferred in some instances to accelerate the reaction. Examples of suitable catalysts include tin(II) and tin(IV) compounds, such as stannous octoate, dibutyl tin dilaurate, dibutyltin oxide, tertiary amine compounds such as triethylamine, diazabicyclononane, and bis-(dimethylaminoethyl) ether, morpholine compounds such as β,β'-dimorpholinodiethyl ether, carboxylates such as bismuth carboxylates, zinc bismuth carboxylates, potassium octoate and potassium acetate, iron (III) chloride. The preferred catalysts are FASCAT® 2003 from Elf Atochem North America and DABCO® from Air Products. The amount of catalyst used is typically from about 5 to about 200 parts per million of the total weight of prepolymer reactants. Higher catalyst levels may be used if desired.

Plasticizers

The polyurethane prepolymers may be prepared in the absence of any plasticizer or, alternatively, in the presence of a plasticizer that acts as a diluent in order to obtain the prepolymer of desirable viscosity. The plasticizer can be added at any time during prepolymer preparation or before the prepolymer mixture is dispersed in water, e.g., separately or as a mixture with one or more reaction components prior to prepolymer preparation. The disclosure of U.S. Pat. No. 6,576,702 is incorporated herein by reference.

Use of a plasticizer as a diluent serves a number of important functions. First, use of other diluents or solvents such as N-methylpyrrolidinone (NMP), acetone and the like is avoided or reduced, together with attendant fire, pollution and toxicity hazards of such other diluents and solvents. The plasticizer is used substantially in place of such other organic diluents and solvents, and most preferably completely in place of such other organic diluents and solvents. The amount of such other organic diluents and solvents typically is less than about 20 wt. %, preferably less than about 10 wt. %, more preferably less than about 5 wt. %, and most preferably is about 0 wt. % of total prepolymer weight. Furthermore, solids content of the final product is increased, since the plasticizer remains in the final product and does not require a burdensome product purification process. Moreover, intimate mixing of the plasticizer occurs, thereby avoiding or reducing problems that can occur with plasticizer addition any time after the prepolymer is dispersed in water, such as stratification and bleeding. (Stratification and bleeding can occur when a plasticizer is added following prepolymer dispersion in water; the plasticizer typically is not well mixed and separates from the composition.) Moreover, addition of plasticizer during prepolymer formation or before prepolymer dispersion in water enhances polyurethane film formation during subsequent processing, since the intimately mixed plasticizer allows easier coalescence. Moisture resistance of the polyurethanes of this invention also is enhanced, since the intimately mixed plasticizer is usually hydrophobic and tends to slow hydrolysis, especially of polyester-based polyurethanes.

Plasticizers are selected for use in this invention according to parameters such as compatibility with the particular polyurethane and desired properties of the final composition. For example, polyester plasticizers tend to be more compatible with polyester-based polyurethanes. Reactive plasticizers can be used that react with functionality of the ingredients. For example, epoxy groups may be present in reactive plasticizers that react with other compounds such as aminated, carboxylated and hydroxylated compounds respectively. Ethylenically unsaturated groups may be present in reactive plasticizers that react with compounds having ethylenic unsaturation. Plasticizers can also be selected to impart particular properties such as flame retardancy to the polyurethanes, or to enhance particular properties such as wetting, emulsifying, conditioning, and UV absorption in end-use applications. The plasticizers typically are used in amounts from about 5 to about 25 wt. % based on prepolymer weight. The minimum amount of plasticizer for applications such as wood coatings, plastic coatings, textile coatings, nonwovens and paper, gloves, personal care, and the like, is determined by the desired viscosity of the prepolymer, and the optimum amount of plasticizer is determined according to the particular application, as is well known to those skilled in the art.

Suitable plasticizers include ester derivatives of such acids and anhydrides as adipic acid, azelaic acid, benzoic acid, citric acid, dimer acids, fumaric acid, isobutyric acid, isophthalic acid, lauric acid, linoleic acid, maleic acid, maleic anhydride, melissic acid, myristic acid, oleic acid, palmitic acid, phosphoric acid, phthalic acid and its isomers, ricinoleic acid, sebacic acid, stearic acid, succinic acid, pyromellitic acid, and the like, and mixtures thereof. Also suitable are epoxidized oils, glycerol derivatives, paraffin derivatives, sulfonic acid derivatives, and the like, and mixtures thereof and with the aforesaid derivatives. Specific examples of such plasticizers include diethylhexyl adipate, heptyl nonyl adipate, diisodecyl adipate, the adipic acid polyesters sold by Solutia as the Santicizer series, dicapryl adipate, dimethyl azelate, diethylene glycol dibenzoate and dipropylene glycol dibenzoate (such as the K-Flex® esters from Kalama Chemical), polyethylene glycol dibenzoate, 2,2,4-trimethyl-1,3-pentanediol monoisobutyrate benzoate, 2,2,4-trimethyl-1,3-pentanediol diisobutyrate, methyl (or ethyl, or butyl) phthalyl ethyl glycolate, triethyl citrate, dibutyl fumarate, 2,2,4-trimethyl-1,3-pentanediol diisobutyrate, methyl laurate, methyl linoleate, di-n-butyl maleate, tricapryl trimellitate, heptyl nonyl trimellitate, triisodecyl trimellitate, triisononyl trimellitate, isopropyl myristate, butyl oleate, methyl palmitate, tricresyl phosphate, dimethyl phthalate, diethyl phthalate, dibutyl phthalate, diisobutyl phthalate, di-2-ethylhexyl phthalate, octyl decyl phthalate, diisodecyl phthalate, heptyl nonyl phthalate, diundecyl phthalate, ditridecyl phthalate, dicyclohexyl phthalate, diphenyl phthalate, butyl benzyl phthalates such as the n-butylbenzyl ester of o-phthalic acid, isodecyl benzyl phthalate, alkyl($C_7/C_9$)benzyl phthalate, dimethoxyethyl phthalate, 7-(2,6,6,8-tetramethyl-4-oxa-3-oxo-nonyl) benzyl phthalate, di-2-ethylhexyl sebacate, butyl ricinoleate, dimethyl sebacate, methyl stearate, diethyl succinate, the butyl phenylmethyl ester of 1,2-benzenedicarboxylic acid, epoxidized linseed oil, glycerol triacetate, chloroparaffins having about 40% to about 70% Cl, o,p-toluenesulfonamide, N-ethyl p-toluene sulfonamide, N-cyclohexyl p-toluene sulfonamide, sulfonamide-formaldehyde resin, and mixtures thereof. Other suitable plasticizers known to those skilled in the art include castor oil, aromatic petroleum condensate, partially hydrogenated terphenyls, silicone plasticizers such as dimethicone copolyol esters, dimethiconol esters, silicone carboxylates, guerbet esters, and the like, alone or as mixtures with other plasticizers.

Examples of suitable reactive plasticizers include compositions and mixtures having ethylenic unsaturation, such as triallyl trimellitate (TATM), Stepanol PD-200LV (a mixture of (1) unsaturated oil and (2) polyester diol reaction product of o-phthalic acid and diethylene glycol from Stepan Company), and the like, and mixtures thereof. Other suitable reactive plasticizers include epoxidized plasticizers, including certain monofunctional and polyfunctional glycidyl ethers such as Heloxy® Modifier 505 (polyglycidyl ether of castor oil) and Heloxy® Modifier 71 (dimer acid diglycidyl ether) from Shell Chemical Company, and the like, and mixtures thereof. Oxidatively curable plasticizers include castor, linseed, soybean, sunflower seed oils and the like.

Examples of suitable flame retardant plasticizers include phosphorus-based plasticizers such as cyclic phosphates, phosphites, and phosphate esters, exemplified by Pliabrac TCP (tricresyl phosphate), Pliabrac TXP (trixylenyl phosphate), Antiblaze N (cyclic phosphate esters), Antiblaze TXP (tar acid, cresol, xylyl, phenol phosphates), and Antiblaze 524 (trixylyl phosphate) from Albright & Wilson Americas; Firemaster BZ 54 (halogenated aryl esters) from Great Lakes Chemicals; chlorinated biphenyl, 2-ethylhexyl diphenyl phosphate, isodecyl diphenyl phosphate, triphenyl phosphate, cresyl diphenyl phosphate, p-t-butylphenyl diphenyl phosphate, triphenyl phosphite, and the like. Other examples of phosphorus-based plasticizers include chlorinated alkyl phosphate esters such as Antiblaze 100 (chloro alkyl diphosphate ester) from Albright & Wilson Americas; alkyl phosphates and phosphites such as tributyl phosphate, tri-2-ethylhexyl phosphate, and triisoctyl phosphite; other organophosphates and organophosphites such as tributoxy ethylphosphate; other phosphates and phosphonates such as chlorinated diphosphate and chlorinated polyphosphonate; and the like. Mixtures can also be used.

Examples of suitable wetting, emulsifying, and conditioning plasticizers include alkyloxylated fatty alcohol phosphate esters such as oleth-2 phosphate, oleth-3 phosphate, oleth-4 phosphate, oleth-10 phosphate, oleth-20 phosphate, ceteth-8 phosphate, ceteareth-5 phosphate, ceteareth-10 phosphate, PPG ceteth-10 phosphate, and mixtures thereof.

Neutralization

Optional neutralization of the prepolymer having pendant carboxyl groups converts the carboxyl groups to carboxylate anions, thus having a water-dispersibility enhancing effect and increasing hydrophilicity of the prepolymer. It therefore follows that only relatively hydrophilic prepolymers would be neutralized. Suitable neutralizing agents include tertiary amines, metal hydroxides, ammonium hydroxide, phosphines, and other agents well known to those skilled in the art. Tertiary amines are preferred and include triethyl amine (TEA), dimethyl ethanolamine (DMEA), N-methyl morpholine, and mixtures thereof. It is recognized that primary or secondary amines may be used in place of tertiary amines, if they are sufficiently hindered to avoid interfering with the chain extension process. Neutralizing agents are typically added to the prepolymer or to water or both before dispersing.

Neutralization may be conducted at different stages of the process:
(1) prior to prepolymer formation by treating the component containing the potential ionic group(s);
(2) after prepolymer formation or before or during the prepolymer mixing, but prior to dispersing the prepolymer, or
(3) by adding a portion or all of the neutralizing agent to all or a portion of the dispersing water.

When the potential ionic groups (groups that become ionized upon neutralization, or any other chemical modification) of the prepolymer are neutralized, they provide hydrophilicity to the prepolymer and enable it to form a stable dispersion in water. The potential ionic groups do not provide this degree of hydrophilicity without neutralization. Therefore, a sufficient amount of the potential ionic groups must be neutralized to yield a stable polyurethane-urea dispersion. Generally, at least about 75%, preferably at least about 90%, of the potential anionic groups are neutralized to form a corresponding salt. Larger amounts of potential ionic groups may remain unneutralized if the initial amount used is higher or an additional mechanism of stabilization is employed. No firm guidelines can be given as to the amount of anionic groups needed, since the dispersibility of the polyurethane-urea depends on many factors. In general, the acid number should be at least 14 to make a colloidally stable dispersion.

The anionic or potential anionic groups may be chemically incorporated into the isocyanate-terminated prepolymer or may be chemically incorporated through the chain extender which is used to form the polyurethane-urea from the prepolymer. Suitable-compounds for incorporating these groups include:

(i) monoisocyanates or diisocyanates which contain anionic or potential anionic groups and (ii) compounds which are monofunctional or difunctional in the isocyanate-polyaddition reaction and contain anionic or potential anionic groups.

Preferred anionic groups are carboxylates (—COO$^-$) and sulfonates (—SO$_3^-$). The anionic groups are formed by neutralizing the corresponding potential ionic groups either prior to, during or after formation of the polyurethane-urea. When the potential anionic groups are neutralized prior to their incorporation into the polyurethane-urea, the anionic groups are incorporated directly. When neutralization is performed subsequent to forming the polyurethane-urea, potential ionic groups are incorporated. Suitable compounds for incorporating the previously discussed carboxylate or sulfonate groups are described in U.S. Pat. Nos. 3,479,310, 4,108,814 and 4,303,774, the disclosures of which are herein incorporated by reference. The preferred sulfonate groups for incorporation into the isocyanate-terminated prepolymer are the diol sulfonic acids or diol sulfonates disclosed in U.S. Pat. No. 4,108,814.

The preferred carboxylate groups for incorporation into the isocyanate-terminated prepolymer are derived from hydroxy-carboxylic acids of the general formula:

(HO)$_x$Q(COOH)$_y$.

wherein, Q represents a straight or branched, hydrocarbon radical containing 1 to 12 carbon atoms, and x and y represent values from 1 to 3.

Examples of these hydroxy-carboxylic acids include citric acid and tartaric acid.

The preferred acids are those of the abovementioned formula wherein x is 2 and y is 1. These dihydroxy alkanoic acids are described in U.S. Pat. No. 3,412,054, herein incorporated by reference. The preferred group of dihydroxy alkanoic acids are the dimethylol alkanoic acids represented by the structural formula:

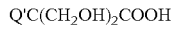

Q'C(CH$_2$OH)$_2$COOH wherein, Q' is hydrogen or an alkyl group containing 1 to 8 carbon atoms.

The most preferred compounds are dimethylol propanonic acid, (Q' is methyl) and dimethylol butanoic acid (Q' is ethyl).

When incorporating the anionic or potential anionic groups through the chain extender used to convert the isocyanate-terminated prepolymer to the polyurethane-urea in the second stage of the two-stage process, it is preferred to use amino functional compounds containing anionic or potential anionic groups such as the diamino carboxylic acids or carboxylates disclosed in U.S. Pat. No. 3,539,483, salts of isethionic acid or 2,6-diamino-hexanic acid or more preferably diamino sulfonates of the formula H$_2$N—A—NH—B—SO$_3^-$ wherein A and B represent aliphatic hydrocarbon radicals containing 2 to 6 carbon atoms, preferably ethylene groups.

In order to convert the potential anionic groups to anionic groups either before, during or after their incorporation into the polyurethane-ureas, volatile and nonvolatile cations are used to form the counterions of the anionic groups.

Volatile cations for neutralizing the potential anionic groups are the primary, secondary or tertiary amines. Of these, the tertiary amines are preferred. Examples of these amines are trimethyl amine, triethyl amine, triisopropyl amine, tributyl amine, N,N-dimethyl-cyclohexyl amine, hexamethylenetetramine, N,N-dimethylstearyl amine, N,N-dimethylaniline, N-methylmorpholine, N-ethylmorpholine, N-methylpiperazine, N-methylpyrrolidine, N-methylpiperidine, N,N-dimethylethanol amine, N,N-diethylethanol amine, triethanol amine, N-methyldiethanol amine, dimethylaminopropanol, 2-dimethylamino-2-methyl-1-propanol, 2-methoxyethyldimethyl amine, N-hydroxyethylpiperazine, 2-(2-dimethylaminoethoxy)-ethanol and 5-diethylamino-2-pentanone. The advantage of tertiary amines is that they do not take part in the isocyanate-polyaddition reaction. This is very important when potential anionic groups are neutralized prior to dispersion of the prepolymer in water.

Nonvolatile cations include monovalent metals, preferably alkali metals, more preferably lithium, sodium and potassium and most preferably sodium. The cations may be used in the form of inorganic or organic salts, preferably salts wherein the anions do not remain in the dispersions such as hydroxides, carbonates or bicarbonates.

Chain Extenders

Optional chain extension of polyurethane particles may be carried out at any time during the formation of the dispersion. Chain extension is employed to increase the molecular weight of polyurethane. Chain extension will thus, to a large extent, freeze or retain the morphology that the polyurethane particles have evolved into at that point during the dispersion formation. Chain extension will also give the final dispersion the desirable physical properties, such as the ability to form a film. The amount of a chain extender will depend on the desired molecular weight of the final product, but generally chain extender or extenders will be used in the amount that would be equal to or less than one equivalent to the available isocyanate groups, such as from 0 to 1 equivalent or from 0.5 to 0.98 equivalent of the isocyanate groups. Only one specific chain extender, such as a polyamine, may be used or a mixture of polyamines or a mixture of a polyamine and another type of a chain extender or one or more chain extenders other than polyamines may be employed, such as alcohol and/or water.

As a chain extender, at least one of water, inorganic or organic polyamine having an average of about 2 or more primary and/or secondary amine groups, or combinations thereof is suitable for use in the present invention. Suitable organic amines for use as a chain extender include diethylene triamine (DETA), ethylene diamine (EDA), meta-xylylene-diamine (MXDA), aminoethyl ethanolamine (AEEA), and 2-methyl pentane diamine. Also suitable for practice in the present invention are propylene diamine, butylene diamine, hexamethylene diamine, cyclohexylene diamine, phenylene diamine, tolylene diamine, 3,3-dichlorobenzidene, 4,4'-methylene-bis-(2-chloroaniline), 3,3-dichloro-4,4-diamino diphenylmethane, and mixtures thereof. Other suitable amines include hydrazine, substituted hydrazines, and hydrazine reaction products. Hydrazine is preferred and is most preferably used as a solution in water. The amount of chain extender typically ranges from about 0.5 to about 0.98 equivalents based on available isocyanate.

Chain extension may be carried out during the dispersing step or after the dispersion has been formed or both during the dispersing step and after the formation of the dispersion.

A chain extender(s) may be added to the water in full or in part before the mixture of the prepolymers is added to make the dispersion or after the dispersion of the prepolymers has been made.

Polymer Branching

Polymer branching may be beneficial, but is not required to maintain a high tensile strength and improve resistance to creep, that is, recovery to that of or near its original length after stretching. Branching may be accomplished during the prepolymer step and/or the extension step. For branching during the extension step, the chain extender diethylenetriaminol is preferred, but other amines having an average of about two or more primary and/or secondary amine groups may also be used. For branching during the prepolymer step, it is preferred that trimethylol propane (TMP) and other polyols having an average of about two or more hydroxyl groups be used. When used, the branching monomers may be present in amounts from about 0.1 wt. % to about 5 wt. % of the polymer backbone.

Other Additives for Preparation of Dispersions

Other additives well known to those skilled in the art can be used to aid in preparation of the dispersions of this invention. Such additives include surfactants, stabilizers, defoamers, antimicrobial agents, antioxidants, UV absorbers, carbodiimides, and the like.

Prepolymer Formation and Ratios of Isocyanate to Active Hydrogen

Polyurethane prepolymers are prepared in a well known manner, that is, by reacting one or more diisocyanates with one or more active hydrogen-containing compounds. In making the prepolymers, the ratio of isocyanate to active hydrogen typically ranges from about 1.3/1 to about 2.5/1, preferably from about 1.5/1 to about 2.1/1, and more preferably from about 1.7/1 to about 2/1. When aliphatic diisocyanates are employed the reaction temperature is generally between 50° C. and 120° C. When aromatic diisocyanates are employed, the reaction is carried out at a somewhat lower temperature, generally between 50° C. and 100° C.

As stated above, it is desirable sometimes to make the prepolymer in such a way as to minimize its resultant viscosity. In neat (no solvent) and solution polymers, viscosity is determined largely by the molecular weight of the polymer. To minimize the molecular weight of a finished prepolymer, one may use an NCO to active hydrogen equivalent ratio of about 1.6:1 to about 2:1. In this way the polyol or polyamine are essentially endcapped by the diisocyanate species, leaving an isocyanate terminated prepolymer of relatively low viscosity. As the NCO to active hydrogen ratio of a prepolymer is reduced, the resultant viscosity increases dramatically. It is recognized that diluent-free materials can be made at below about 2/1 NCO to active hydrogen equivalent ratios, but they become more difficult to process, pump, stir, and the like. Also, higher temperatures might be needed to work with such a prepolymer, which increases the likelihood of undesirable side reactions.

If the NCO to active hydrogen equivalent ratio exceeds 2/1, then the excess diisocyanate will function as a diluent, further reducing viscosity. While this is a desired effect, raising the NCO to active hydrogen ratio above about 2/1 can also have negative effects. When isocyanate content of a polyurethane is increased, the hardness, or modulus of the polyurethane, along with the yield point, is increased. While acceptable for hard coatings, this is undesirable for producing a "rubbery" polymer. Also, when excess diisocyanate (obtained from using an NCO to active hydrogen equivalent ratio greater than about 2/1) is introduced into a dispersion and this dispersion is then extended with a primary (or secondary) amine(s), high molecular weight polyureas may be formed. These materials are not easily dispersible, but by controlling the ratio in the range of closer to about 2/1, the results will be increasingly satisfactory. If an excess of isocyanate is used, it may result in gels or grittiness in a cast film and in a sediment in the dispersion. This can lead to weakened films having a poor appearance. For these reasons, NCO to active hydrogen equivalent ratios of about 1.4/1 to about 2/1 are generally preferred.

In making the prepolymers, the selection of a particular reactant, especially the isocyanate-reactive compound, will depend on the desired morphology of the polyurethane particle that is desired in the dispersion. For example, if a core-shell morphology is desired, it is preferable to have a greater difference in hydrophilicity between the two prepolymers. In such a case to make the hydrophilic prepolymer, it would be preferable to employ such polyols as polyethylene glycol, phosphonated polyols, carboxylated polyols or sulfonated polyols because such polyols are water soluble or have high affinity to water and would yield more hydrophilic prepolymers. On the other hand, to make the hydrophobic core prepolymer, it would be preferable to employ such polyols as silicone polyols, fluorinated polyols such as Polyfox® polyol (a trademark of Aerojet General), (meth)acrylic and vinyl polyols containing long hydrocarbon side chains (at least 4 carbons), styrenic polyols or hydrocarbon polyols such as polybutadiene, hydrogenated polybutadiene, polyisoprene or polyisobutylene polyols and the like because such polyols are not water soluble. Such hydrophilic and hydrophobic polyols can be used alone or in combination with each other or with other polyols mentioned above.

Mixing Prepolymers and Dispersion Formation

The critical element of the method of this invention is the preparation of a mixture of prepolymers before the dispersion is made. Mixing should be continued until an intimate mixture (a close association or physical contact of different prepolymers) is obtained, that is, essentially a uniform mixture of the prepolymers is attained; in other words, until there is a uniform distribution of different prepolymers throughout the mixture. Generally it is sufficient to mix for about 10 minutes to 2 hours, but one skilled in the art will recognize that the actual time will depend on the viscosities of the prepolymers, the configuration of the reactor, blade(s) and baffle(s), the rate of mixing and the number of the prepolymers being mixed. Thereafter a dispersion of the prepolymer mixture is made. If the prepolymers are not mixed prior to their addition to water, the compositions of this invention will not result.

When two prepolymers are mixed, either one can be added to the other. If three or more prepolymers are mixed, it is similarly not important, for the purpose of this invention, what the order of addition of the prepolymers is, or whether all of them are added simultaneously. Mixing of prepolymers and/or dispersing may be conducted in a continuous fashion by in-line mixing or by other various continuous processes known to those skilled in the art.

Dispersion is made from the prepolymers in a standard manner known to those skilled in the art. Typically the prepolymers are transferred into another reactor containing water and optionally neutralizing amine(s) and possibly other optional auxiliary components. Chain extender(s) is added at a desirable point as discussed above. The phase separation between the prepolymer components in the particle (and resulting particle morphology) is a dynamic diffusion process which can be affected by various parameters such as difference in prepolymer hydrophilicities, viscosity, temperature, duration of mixing before extension, the extent of spontaneous extension by water reaction during mixing time, particle size and other.

Usually different prepolymers are prepared separately and then mixed as discussed above. However, the polymers of the present invention can be made in one prepolymer reactor according to the following steps:

1. The first prepolymer is made according to conventional methods.
2. The unreacted isocyanate groups are blocked (protected) by a blocking agent(s).
3. The components of the second prepolymer are charged to the same reactor and allowed to react. Since the isocyanate groups of the first prepolymer are protected, they do not participate in the second stage to a significant extent.
4. The process is continued with neutralization, dispersion, and extension as described earlier.

Steps 2 and 3 can be repeated with different components one or more times before proceeding to step 4.

Isocyanate Blocking Agents

Several types of compounds can be employed as blocking (a.k.a. protecting or masking) agents. Their function is to temporarily protect isocyanate groups from undesired reactions. The main requirement for the blocking compound is for its reaction with isocyanate to be reversible. When the reaction is reversed, the isocyanate group is regenerated and is available for further reactions. The reverse reaction can be triggered by physical or chemical means, for example, by elevated temperatures, radiation, vacuum, catalysts, compounds with active hydrogen, or combinations thereof. The blocked isocyanate method can be employed for both single and multiple prepolymer reactor processes.

Examples of blocking agents include oximes, phenols, alcohols, lactams, imidazoles, mercaptanes, imides, secondary amines, sulfites, acetoacetates and derivatives of malonic acid.

Oximes are generally preferred but can be replaced partially or in full by other blocking agents. Oximes can be represented by a general formula $CRR'=NOH$, where R and R' may independently be H or $C_nH_{2n+1}$. R and R' may also contain cycloaliphatic, aromatic groups, and groups with heteroatoms including heterocyclic groups. The oxime may be an aldoxime when one or both R and R' are hydrogen, or ketoxime when both R and R' are hydrocarbyl groups. Examples of aldoximes include formaldoxime, acetaldoxime, propionaldoxime, butyraldoxime, benzaldoxime and the like. Examples of ketoximes include acetoxime, butanone oxime, cyclohexanone oxime, acetophenone oxime and the like.

Other preferred blocking agents include lactams, secondary and tertiary alcohols, pyrazoles and their mixtures. Some specific examples of other suitable blocking agents include dimethyl malonate, triazole, caprolactam, phenol, dimethylpyrazole, dibutylamine, diisopropylamine, tert-butanol, cyclohexanol, and isopropanol. Combinations of two or more blocking agents can be used if a stepwise reaction is desired, particularly mixtures of blocking agents which deblock at different temperatures.

The deblocking may occur during chain extension or during polymer drying and/or curing. Often it is preferred to use a blocking agent, which will evaporate from the polymer during drying or curing. In these cases, low molecular weight oximes such as acetoxime, butanone oxime, butyraldoxime and the like are preferred.

At least one prepolymer must be isocyanate terminated (optionally blocked) but at least one prepolymer may be hydroxyl terminated. When the isocyanate group is blocked, it will not react with the hydroxyl terminated prepolymer. The dispersion containing such prepolymers are useful in applications when deferred extension/cure/crosslinking is desired. The extension/cure/crosslinking may involve either the isocyanate group (after deblocking) or the hydroxyl group or both groups.

Properties of Dispersions

The novel polyurethane particles prepared by the method of this invention have properties not possessed by particles prepared by prior art methods. The dispersions prepared by the novel method can, for example, have improved hydrolytic stability, that is, the particles of such dispersions undergo substantially less hydrolysis than particles prepared by prior art methods. For this reason such dispersions are stable, without undergoing substantial hydrolysis, for longer periods of time and are also substantially resistant to viscosity change.

Other properties which can be impacted by the new non-uniform particle morphology include physical and mechanical properties such as tensile, modulus and elongation, diffusion and barrier properties, chemical resistance, etc. Also the non-uniform particle morphology of this invention can impact film surface properties, such as coefficient of friction, tack, adhesion, resistance to staining and blocking.

The dispersions of this invention typically have total solids of at least about 20 wt. %, preferably at least about 25 wt. % and more preferably at least about 30 wt. %.

Additional Modifications

The dispersions of this invention may be chemically modified, if desired. It is possible to graft ethylenically unsaturated monomers onto the core, the shell or the gradient layer or all or any of such layers. To accomplish this, it is necessary to employ a prepolymer that contains an ethylenic unsaturation or graftable groups that can act as the site for grafting of ethylenic monomers. The radically polymerizable monomer(s) can be added either to the prepolymer during any stage of its formation or to the dispersion or both. After the dispersion is formed, a polymerization initiator may be added to the prepolymer mixture and the mixture heated to the necessary temperature to effect polymerization. Alternatively, a redox initiator system or radiation may be used. The added monomer(s) will be grafted unto any layer or layers that contained the necessary sites.

The grafting of the radically polymerizable monomers is optional for the purpose of the present invention. The formation of the urethane-acrylic or vinyl hybrid can be achieved essentially without any grafting between the polymers. The addition of a reactive diluent(s) may be made at any stage of the process, such as during the prepolymer(s) formation, during or after dispersion, or during or after extension. The diluent(s) can be added in portions during all above mentioned stages. Reactive diluent(s) may also be mixed with any of the starting materials.

Furthermore, each phase in the dispersion particles may be also modified by incorporating monomers that will impart the desired property to the dispersion. For example, by incorporating certain ethylenic monomers, such as acrylic acid, it is possible to increase the hydrophilic property of that prepolymer. Similarly, by incorporating certain monomers, such as styrene, it is possible to increase hydrophobicity of that prepolymer. Other properties, such as elasticity, rigidity may similarly be modified.

Suitable monomers that may be used in modifying the dispersions of this invention, as explained above, include any monomers capable of undergoing a radical polymerization such as alkyl and cycloalkyl(meth)acrylates and their derivatives, vinyl esters and ethers, aromatic monomers, conjugated dienes, olefins, (meth)acrylic and other polymerizable acids, acrylamide and its derivatives, vinyl chloride, vinyl fluoride, vinylidene chloride, vinylidene fluoride, (meth)acrylonitrile, di- and multifunctional monomers. Specialty monomers which impart specific functions such as crosslinkability, wet adhesion, flame retardancy, non-ionic character, adhesion to glass, etc. may also be used. The selection of the particular comonomer is not critical to the present invention and will generally depend upon the properties sought for the application of the final polymer product. Chain transfer agents can be used to control the molecular weight.

Specific examples of suitable monomers include the following: (meth)acrylate esters such as methyl(meth)acrylate, ethyl(meth)acrylate, n-propyl (meth)acrylate, n-butyl(meth) acrylate, isopropyl(meth)acrylate, isobutyl (meth)acrylate, n-amyl(meth)acrylate, n-hexyl(meth)acrylate, isoamyl (meth)acrylate, 2-hydroxyethyl(meth)acrylate, 2-hydroxypropyl(meth)acrylate, N,N-dimethylaminoethyl(meth) acrylate, N,N-diethylaminoethyl(meth)acrylate, t-butylaminoethyl (meth)acrylate, 2-sulfoethyl(meth)acrylate, trifluoroethyl (meth)acrylate, glycidyl(meth)acrylate, benzyl (meth)acrylate, allyl (meth)acrylate, 2-n-butoxyethyl(meth) acrylate, 2-chloroethyl(meth)acrylate, sec-butyl-(meth)acrylate, tert-butyl(meth)acrylate, 2-ethylbutyl(meth)acrylate, cinnamyl(meth)acrylate, crotyl(meth)acrylate, cyclohexyl (meth)acrylate, cyclopentyl(meth)acrylate, 2-ethoxyethyl (meth)acrylate, furfuryl(meth)acrylate, hexafluoroisopropyl (meth)acrylate, methallyl(meth)acrylate, 3-methoxybutyl (meth)acrylate, 2-methoxybutyl(meth)acrylate, 2-nitro-2-methylpropyl (meth)acrylate, n-octyl(meth)acrylate, 2-ethylhexyl(meth)acrylate, lauryl (meth)acrylate, 2-phenoxyethyl (meth)acrylate, 2-phenylethyl(meth)acrylate, phenyl(meth) acrylate, propargyl(meth)acrylate, tetrahydrofurfuryl(meth) acrylate, norbornyl(meth)acrylate, tetrahydropyranyl(meth) acrylate, vinyl acetate, styrene, alfa-methylstyrene, para-methylstyrene, para-chlorostyrene, butadiene, chloroprene, ethylene, propylene, butylene, isobutylene, (meth)acrylonitrile, vinyl propionate, vinyl chloride, vinylidene chloride, (meth)acrylamide, N-methylol-acrylamide, and acrylic, methacrylic, itaconic and fumaric acids.

In addition to grafting ethylenically unsaturated monomers onto the core-shell or other phases as discussed above, there is also a certain degree of grafting that can take place between the hydrophilic and the hydrophobic prepolymers during the chain extension. This process will occur to a limited extent at the core/shell interphase when the phase separation is complete, but can become significant if the phase separation is incomplete as described above, for example, as in the case of gradient particles. Co-grafting (or cross-extension) is a result of a reaction of the same extender molecule with the isocyanate end-groups of both hydrophilic and hydrophobic components. The degree of grafting will depend on the degree of phase separation: The lower the degree of separation, the higher the degree of grafting and vice versa.

Although the present invention is exemplified by the so-called prepolymer process, it is by no means limited to it. Anybody skilled in the art can take the present invention and apply it to other known methods of making polyurethane dispersions.

Methods of making dispersions include but are not limited to the following:

1. Dispersing prepolymer by shear forces with emulsifiers (external emulsifiers, such as surfactants, or internal emulsifiers having anionic, cationic, amphoteric and/or non-ionic groups as part of or pendant to the polyurethane backbone, and/or as end groups on the polyurethane backbone). This process is particularly preferred if dispersions with high solids content (up to about 70 weight percent) are desired.
2. Acetone process. A prepolymer is formed with or without the presence of acetone, MEK, and/or other solvents that are non-reactive and easily distilled. The prepolymer is further diluted in said solvents as necessary, and chain extended with an active hydrogen-containing compound. Water is added to the chain-extended polyurethane, and the solvents are distilled off. A variation on this process would be to chain extend the prepolymer after its dispersion into water.
3. Melt dispersion process. An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.
4. Ketazine and ketimine processes. Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.
5. Continuous process. An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.
6. Reverse feed process. Water and optional neutralizing agent(s) and/or extender amine(s) are charged to the prepolymer under agitation. The prepolymer can be neutralized before water and/or diamine chain extenders are added.

Polyurethane in dry form containing primarily non-uniform particles of various particle morphologies discussed above may be obtained by methods known to those skilled in the art. For example, by spray drying or freeze drying the dispersion, the unique polyurethane of this invention may be obtained in dry form. During such drying processes, the primarily non-uniform particles will generally undergo partial agglomeration whereby several particles will form a larger dry particle. The degree of agglomeration will depend on various factors, such as the temperature, the degree and speed of drying, surface tension and viscosity of the dispersion and the solids content in the dispersion.

Overview of Applications

The waterborne polyurethane dispersions of the present invention can be processed by methods well known to those skilled in the art (including blending with other polymers and materials) to make coatings and films and other articles.

Additives such as activators, curing agents, stabilizers such as Stabaxol™ P200, colorants, pigments, neutralizing agents, thickeners, non-reactive and reactive plasticizers, coalescing agents such as di(propylene glycol) methyl ether (DPM), waxes, fillers, slip and release agents, antimicrobial agents, surfactants such as Pluronic™ F68-LF and IGEPAL™ CO630 and silicone surfactants, metals, antioxidants, UV stabilizers, antiozonants, and the like, can optionally be added as appropriate before and/or during the processing of the dispersions of this invention into finished products as is well known to those skilled in the art. Additives may be used as appropriate in order to make articles or to treat (such as by impregnation, saturation, spraying, coating, or the like) porous and non-porous substrates such as papers, non-woven materials, textiles, leather, wood, concrete, masonry, metals, house wrap and other building materials, fiberglass, polymeric articles, personal protective equipment (such as hazardous material protective apparel, including face masks, medical drapes and gowns, and firemen's turnout gear and gloves), and the like. Applications include papers and non-wovens; fibrous materials; films, sheets, composites, and other articles; inks and printing binders; flock and other adhesives; and personal care products such as skin care, hair care, and nail care products; livestock and seed applications; and the like.

Key applications for one mode of this invention for polycarbonate-polyester core-shell polyurethane dispersion is: vinyl floor tile coatings, automotive plastic coatings (primarily interior applications), wood floor finishes, hydrolytically stable dispersions, detergent resistant overprint varnishes, business machine coatings, hi-fi equipment coatings, industrial metal coatings, industrial wood finishes (furniture & kitchen cabinet coatings), coil coatings, adhesion to PVC and polycarbonate substrates, fiberglass sizing compounds, vinyl extrusion coatings, and PET film coatings.

Any fibrous material can be coated, impregnated or otherwise treated with the compositions of the present invention by methods well known to those skilled in the art, including carpets as well as textiles used in clothing, upholstery, tents, awnings, and the like. Suitable textiles include fabrics, yarns, and blends, whether woven, non-woven, or knitted, and whether natural, synthetic, or regenerated. Examples of suitable textiles include cellulose acetate, acrylics, wool, cotton, jute, linen, polyesters, polyamides, regenerated cellulose (Rayon), and the like.

The compositions of the present invention can be used as adhesives, including laminates, or to augment or supplement adhesive types well known to those skilled in the art. For example, particular adhesive properties can be achieved by varying type and amount of isocyanate(s); type, amount, and molecular weight of polyol(s); and amount of poly(alkylene oxide) side chain units. Compounding with other ingredients is well understood by those skilled in the art. The dispersions are also useful as binders, in fiberglass sizing and in the manufacture of dipped articles such as gloves.

Blends with Other Polymers and Polymer Dispersions

The waterborne polyurethane dispersions and final (dry) polyurethanes of the present invention can be combined with commercial polymers and polymer dispersions by methods well known to those skilled in the art. Such polymers and dispersions include those described in WIPO Publication WO 02/02657 A2 (incorporated herein by reference in its entirety). Blending can be done by simple mechanical mixing of dispersions or emulsions, or by dispersing prepolymer(s) into a pre-made dispersion or emulsion of another polymer to form a composite or hybrid of various architectures. Such other polymers and polymer dispersions include natural rubber, conjugated-diene-containing polymers including butadiene-containing copolymers with acrylonitrile and/or styrene (such as Hycar® nitrile copolymer emulsions and SBR copolymer emulsions from Noveon, Inc.), polychlorobutadiene (Neoprene), hydrogenated styrene-butadiene triblock copolymers (such as Kraton™ copolymers from Shell Chemical), chlorosulfonated polyethylene (such as Hypalon™ polymers from E.I. duPont), ethylene copolymers (such as EPDM copolymers), acrylic and/or methacrylic ester copolymers (such as Hycar® acrylic copolymers from Noveon, Inc.), vinyl chloride and vinylidene chloride polymers and copolymers (such as Vycar® copolymers from Noveon, Inc.), vinyl acetate polymers and copolymers, polyisobutylenes, polyurethanes (such as Sancure® polyurethanes from Noveon, Inc.), polyureas, and poly(urethane-urea)s. Among preferred compositions are those comprising acrylic and vinyl copolymers and polyurethanes.

Suitable compositions for blending with dispersions of the present invention include those described in the following U.S. patents, all of which are incorporated herein by reference. For example, U.S. Pat. No. 4,920,176 relates to emulsion polymerization in order to prepare nitrile rubber (NBR) latexes. Generally, nitrile latexes comprise polymerized units of butadiene, acrylonitrile, and acrylic acid or methacrylic acid. Additional comonomers can be included to change or improve polymer properties. These include vinylpyridine, acrylic and methacrylic ester monomers, chlorobutadiene, cross-linking agents, styrenic monomers, and the like.

A review article by D. P. Tate and T. W. Bethea, Encyclopedia of Polymer Science and Engineering, Vol. 2, p. 537, further describes polymers and copolymers of conjugated dienes such as butadiene rubber (BR), acrylate-butadiene rubber (ABR), chloroprene rubber (CR), isoprene rubber (IR), and styrene-butadiene rubber (SBR).

U.S. Pat. Nos. 4,292,420 and 6,020,438 relate to emulsion polymerization in order to prepare vinyl chloride latexes. Rigid polyvinylchloride can be softened by the use of plasticizers, such as phthalate and phosphate esters, or by copolymerizing vinyl chloride with "soft" monomers (the so-called internal plasticization monomers), which render soft copolymers with vinyl chloride. Such "soft" monomers include long-chain acrylic and methacrylic esters, vinyl esters, vinyl ethers, acrylamides, and methacrylamides, and are exemplified by butyl acrylate, 2-ethylhexyl methacrylate, vinyl propionate, n-octylacrylamide and the like.

U.S. Pat. No. 6,017,997 relates to the preparation of waterborne polyurethane, polyurea, and poly(urethane-urea) dispersions ("PUD"). Generally PUD comprises polymerized units of diisocyanate and hydrophylic moiety, together with diol, diamine, or both diol and diamine.

The non-uniform polyurethanes of the present invention can be used as impact modifiers and toughening agents for thermoplastic and thermoset resins. The amount of polyurethane added should be in the range from about 2 to about 15% wt. The polyurethane number-average particle size which should be most efficient for impact modification is in the range between about 0.2 to about 1 micron. Thermoplastics include polyvinylchloride (PVC), polycarbonates, polystyrene, chlorinated PVC, and acrylonitrile-butadiene-styrene compositions (ABS). Thermosets include epoxies, phenolics, unsaturated polyesters, vinyl esters, melamine-formaldehyde resins, and aminoplasts. Toughening agents improve peel strength and durability of thermoplastic adhesives.

Personal Care Applications

The waterborne polyurethane dispersions of the present invention are desirable in personal care compositions. The waterborne polyurethane dispersions can be used as film formers in personal care formulations to provide desirable properties such as the following: water or moisture resistance, luster, better spreadability of sunscreen actives, and the like. Such dispersions can be incorporated into personal care products such as daily skin care products (cosmetics, lip balms, moisturizers, eye-lash liners, lipsticks, lip balms, sunscreens, and the like), as well as nail care products, hair care products, and the like. Such personal care products can be lotions, gels, sprays, sticks, compressed liquids, liquid suspensions, and the like.

The following examples are presented for the purpose of illustrating the invention disclosed herein in greater detail. However, the examples are not to be construed as limiting the invention herein in any manner, the scope of the invention being defined by the appended claims.

EXAMPLES

Chemicals Used in Examples

Benzyl benzoate=plasticizer from Morflex, Inc.

Bruggolite® FF6=a formaldehyde-free reducing agent based on sulphinic acid derivative (5% wt solution in water) from Brüggerman Chemical US 2-Butanone oxime from Aldrich Chemical Company, Inc.

tBHP=tert-butyl hydroperoxide (18% wt solution in water) from Aldrich Chemical Company, Inc.

CAPA 2125=caprolactone polyester polyol (number average molecular weight $\overline{M}_n$=1,250 gram/mole or Dalton) from Solvay S.A DBA=dibutylamine from Air Products and Chemicals DeeFo XHD-47J=defoamer from Ultra Additives Inc.

Desmocap 12A=alkyl phenol blocked polyisocyanate prepolymer (unblocked NCO content=1.7%) from Bayer Corporation Desmodur W=1,1'-methylenebis-(4-isocyanato cyclohexane) from Bayer Corporation 500 DI=diethylene glycol isophthalate polyester ($\overline{M}_n$=500), from Panolam Industries Desmophen S-102-55=butylene adipate polyester polyol ($\overline{M}_n$=2,000) from Bayer Corporation Desmophen S-1015-120=hexane neopentyl adipate polyester polyol (average $\overline{M}_n$=1,000) from Bayer Corporation DMEA=N,N-dimethylethanolamine DMPA=dimethylolpropanoic acid from Geo Specialty Chemicals, Inc.

DOTP=Eastman 168 Plasticizer, dioctyl terephthalate from Eastman Chemical Company 2-EHA=2-ethylhexyl acrylate from Celanese FASCAT® 2003=2-ethylhexanoic acid and stannous octoate from Elf Atochem North America FR-522=dibromoneopentyl glycol from Bromine Compounds, Ltd;

HCl=37% hydrochloric acid from J.T. Baker

3000 HA=hexane adipate polyester ($\overline{M}_n$=3,000)

67-1000 HNA=hexane neopentyl adipate polyester ($\overline{M}_n$=1,000) from Panolam Industries 67-3000 HNA=hexane neopentyl adipate polyester (average $\overline{M}_n$=3,000) from Panolam Industries Hydrazine solution=35 wt. % solution in water from Bayer Corporation Isonate 240=polyurethane prepolymer of MDI and polyester polyol prepolymer (NCO content=18.7%) from The Dow Chemical Company IPDI=isophorone diisocyanate from Bayer Corporation KF-6001=hydroxyl terminated polymethylsiloxane from Shin Etsu Printrite PM=polyurethane associative thickener from Noveon, Inc.

PTHF 1000=polytetrahydrofuran ($\overline{M}_n$=1,000) from BASF

PTHF 2000=polytetrahydrofuran ($\overline{M}_n$=2,000) from BASF

PPG-425=polypropylene glycol ($\overline{M}_n$=400) from Bayer Corporation;

PPG-1025=polypropylene glycol ($\overline{M}_n$=1,025) from Bayer Corporation

PPG-2025=polypropylene glycol ($\overline{M}_n$=2,025) from Bayer Corporation

Rucoflex S-102-210=poly(butanediol adipate) from Bayer Corporation

Ruco 337=polycarbonate polyol ($\overline{M}_n$=1,000) from Ruco Polymers (a Sybron Chemical Co.)

TDI=toluene diisocyanate from Bayer Corporation

TEA=triethylamine from Fisher Scientific;

Tegomer D-3403=trimethylolpropane ethoxylated monomethyl ether ($\overline{M}_n$=1,220) from Degussa-Goldschmidt TMP=trimethylolpropane from Celanese Y-14209=siloxane polyalkyleneoxide copolymer from Crompton Corporation Test Methods Used in Examples 1. Brookfield Viscosity (B.V.). Brookfield viscosity testing was performed using a Brookfield RV viscometer and spindles #3 to #6 (depending on viscosity) at 20 rpm and about 77° F.

2. Particle Size (P.S.). The particle size and size distribution of the dispersions were obtained by Submicron Particle Sizer Autodilute PAT Model 370 (NICOMP Particle Sizing Systems).

3. Solids Content. Total solids (T.S.) were measured by Moisture/Solids Analyzer LabWare 9000™ (CEM Corporation).

4. pH Measurements. pH readings were taken using Acumet Basic pH Meter (Fisher Scientific).

5. Tensile Property Measurements. Films for tensile studies were prepared by casting dispersions on Mylar® film using a 10 mil. drawdown bar to apply the dispersions. The films were allowed to air dry thoroughly at room temperature and then at 300° F. in an oven for 3 minutes. The Mylar® film with dried film on it was cut into 1-inch wide strips and the cast film was removed from the Mylar® film. Tensile Strength, % Elongation and Modulus Tests were taken on an Instron according to standard procedure. For hydrolytic stability studies, the films were kept in a Humidity Oven set at 75° C. and 95% humidity for the required time.

6. Transmission Electron Microscopy (TEM) Procedure. The samples were prepared as follows. A small amount of liquid dispersion (about 1 ml) is diluted with distilled water, up to about 5 to 10 ml. A carbon coated TEM Formvar grid is used to pick up an abundant supply of particles from the diluted dispersion. The grid is air dried for at least 30 minutes and the grid is then examined at the appropriate magnification using a Philips CM12 Transmission Electron Microscope.

7. TEM with Cesium Hydroxide Staining: The grid with dispersion particles is floated on several drops of a dilute solution of cesium hydroxide/distilled in water (approximately 2% solution) for 3 to 5 minutes. After the grid is removed from the cesium hydroxide solution, it is then blotted on filter paper and placed on several consecutive drops of distilled water to remove excess cesium hydroxide crystals. At this point, the TEM grid is blotted on filter paper again and dried for another 30 minutes or so. The grid is then ready for TEM examination 8. CryoSEM Procedure. The vial is shaken to homogenize the dispersion prior to sampling. An aliquot is removed with a capillary tube and droplets of the PUD are placed stepwise on the cryoSEM carrier (rivet) that is already secured in the SEM sample holder. A second rivet is placed on top of the droplet and the entire assembly is pre-frozen in liquid nitrogen ($LN_2$), then fully frozen in $LN_2$ slush. Once freezing is complete (a matter of seconds), the entire assembly (carrier/droplet assembly and SEM sample holder and changing rod) is transferred to the cryoprep chamber adjunct to the SEM (also kept a $LN_2$ temperatures and under vacuum). A remote-operated probe is used to knock off the top rivet and fracture through the droplet. The fractured sample is transferred into the SEM viewing chamber, also kept at $LN_2$ temperature. The sample is viewed at a low magnification to determine if the fracture is optimized, then water removal is started. By heating the stage and sample to −96° C. for 5 minutes, a portion of the ice is sublimed away. This process is known as etching in cryoSEM vernacular. The sample is observed throughout the etching process to determine if structures are being revealed. Once the structure is optimized (standard etch time for PUDs has been 5-7 minutes), the sample is removed to the cryoprep chamber and coated with gold to render it completely conductive to the electron beam. The gold coated sample is observed to determine the representative morphology and any unusual morphology. The magnifications are chosen depending upon the size and intricacy of the features. There is no standard set of image magnifications, nor is there a standard number. When examining a series of samples for comparison purposes, it is desirable to record all images at the same magnifications, so that side-by-side evaluations can be done. The only standard conditions used for PUDs are 25 kV accelerating voltage and placement of a micron bar on each image. The images are recorded as TIFF files on CD, then copied and converted to JPEG files and processed for contrast, brightness and tone prior to presentation.

9. NCO Titration. A sample of prepolymer (~3 grams) is weighed in a 250-ml Erlenmeyer flask. Toluene (50 ml) and 2M dibutylamine solution in toluene (20 ml) are added and the mixture is heated on a hot plate until the prepolymer completely dissolves. The flask is filled up to 200 ml with isopropanol. Bromophenol blue indicator (6-7 drops) is added and solution is titrated with 1N HCl solution until the color changes from blue to light yellow.

10. Sliding Angle Tests. Films for sliding angle studies were prepared by casting dispersions on Melinex® polyester film using a 10 mil draw down bar to apply the dispersions. The films were allowed to air dry thoroughly at room temperature and then at 300° F. in an oven for 3 minutes. The Melinex® films with dried film on it were cut into 2×5¼ inch and 4×7 inch strips. Sliding angle measurements were taken using a Coefficient of Friction Tester, Model No. 32-25 (Testing Machines, Inc.). The smaller strips were fixed to the Sliding Fiberboard (757 grams) and the larger strips were fixed to the Inclined Plane Tester panel. The panel was inclined slowly to measure the angle of inclination at which the fiberboard begun to slide.

Summary of Examples

Example 1 illustrates the concept by making brominated shell which shows as dark areas on TEM pictures due to high atom number of Bromine. This composition can be useful in flame retarding applications.

Example 2 illustrates the concept with cesium staining.

Example 3 is a control when all the ingredients from Example 2 were put in one pot and cooked.

Example 4 illustrates the concept by making rubbery core and hard shell and fracturing the particle under cryogenic conditions. The shell fractures as a glass due its high modulus, while core rips apart like rubber due to its elastic nature. Having large particle size (~3 micron), this composition can be useful as an impact modifier for plastics.

Example 6 is a procedure for making "ice-cream cone" particles in a two-pot synthesis.

Example 7 and comparative Example 8 demonstrate an improved hydrolytic stability of polyester-polycarbonate hybrid by separating the polyester polyol from the acid (DMPA) which works as a catalyst for the polyester hydrolysis.

Example 31 is a procedure for making solvent-free anionic/non-ionic mixed stabilization core-shell Example 32 is a repeat procedure for Example 2 in U.S. Pat. No. 5,959,003.

Example 33 is a control of Example 32 with brominated shell.

Example 34 is a control of Example 32 with brominated core.

Example 36 is procedure for making core-shell dispersion in one pot via in-situ blocked core prepolymer.

Example 37 is a procedure for making core-shell dispersion in one pot via commercially available blocked prepolymer used as a core component.

Example 38 is a procedure for making core-shell dispersion in one pot via commercially available isocyanate prepolymer used as a core component.

Example 39 shows a dispersion obtained from 2 prepolymers having the same acid numbers but different polyols (polyester and polyether) and different isocyanates (Desmodur W and IPDI).

Example 1

Polyester Core/Brominated Polyether Shell

Preparation of Core Prepolymer 1949 g of 67-1000 HNA, (OH number 121.5 mg KOH/g) and 1052 g of Desmodur W were charged to a reactor. The reaction mixture was heated to about 230° F. (110° C.) and allowed to cool and equilibrate at 210-215° F. (98.9-101.6° C.). The mixture was stirred under a blanket of nitrogen for ~3 hours. The remaining NCO was measured at 5.21%. The reactor was cooled to 180° F. (82.2° C.).

Preparation of Shell Prepolymer

The following materials were charged to a reactor: 81 g of PPG-1025 (OH number 110.6 mg KOH/g), 157 g of IPDI and 13.4 g of FR-522 and heated to 190° F. (87.8° C.). 60 g of NMP was charged to the reactor followed by 32 g of DMPA and the mixture was heated to 210° F. (98.9° C.) under a blanket of nitrogen. One drop of the catalyst FASCAT® was added and the reaction mixture was stirred at 210-220° F. (98.9-104.4° C.) for 2.5 hours under a blanket of nitrogen. The remaining NCO was measured at 8.10%. The prepolymer was cooled to 180° F. (82.2° C.).

Mixing of Prepolymers

Core prepolymer (270 grams) was added to the shell prepolymer resulting in a 50/50% wt mixture. The blend was stirred at 180° F. (82.2° C.) for about 15 min. The blend NCO was measured at 6.66%. The blend was cooled to 140° F. (60° C.). The viscosity was measured and found to be 20,800 cP at 140° F. (60° C.).

Neutralization, Dispersion and Extension

The prepolymer blend (700 grams) was charged over the course of about 5 minutes with mixing into water (825 grams) at 60° F. (15.5° C.) containing DMEA (17.8 grams). The defoamer DeeFo XHD-47J (0.2 grams) was added after about 5 min. The mixture was stirred for about 30 min and 26.3 grams of hydrazine solution (35 wt. %) was added to the formed dispersion.

Dispersion properties: T.S.=35%, pH=8.3, B.V.=29 cP, P.S.=100 nm.

FIG. 4 shows the Transmission Electron Microscopy (TEM) picture of the dispersion obtained in Example 1 and FIG. 13 shows a uniform distribution of the particle size of the dispersion obtained in Example 1.

Example 2

Polyester Core/Polycarbonate Shell

Preparation of Core Prepolymer

The following materials were charged to a reactor: 307 g of 67-1000 HNA (OH number 120.7 mg KOH/g), 173 g of Desmodur W and 120 g of NMP. The reaction mixture was then heated to 210-220° F. (98.9-104.4° C.) and stirred 1 hour under a blanket of nitrogen. One drop of the catalyst FAS-CAT® was added. Stirring was continued at 210-220° F. (98.9-104.4° C.) for another 1.5 hours. The remaining NCO was measured at 3.84%. The reactor was cooled to 180° F. (82.2° C.).

Preparation of Shell Prepolymer

The following materials were charged to a reactor: 44 g of Ruco 337 (OH number 130.1 mg KOH/g), 46 g of DMPA, 208 g of Desmodur W and 128 g of NMP. The reaction mixture was then heated to 200-220° F. (93.3-104.4° C.) and stirred 1 hour under a blanket of nitrogen. One drop of the catalyst FASCAT® was added. Stirring was continued at 210-220° F. (98.9-104.4° C.) for another 1.5 hours. The remaining NCO was measured at 6.45%. The prepolymer was cooled to 180° F. (82.2° C.).

Mixing of Prepolymers and Neutralizing

The core prepolymer (373 grams) was added to the shell prepolymer resulting in a 50/50% wt. mixture. The blend was stirred at 180° F. (82.2° C.) for 15-20 min. The blend NCO was measured using a titration with DBA and 1.0M HCl, and was found to be 5.44%. The blend was cooled to 145-150° F. (62.8-65.5° C.). 38.3 g of TEA was charged to the blend and allowed to mix for 5 min.

Dispersion and Extension

The neutralized prepolymer blend (700 grams) was charged over the course of about 5 minutes with mixing into water (1011 grams) at ambient temperature. The mixture was stirred for another 1 hour and to the formed dispersion, 22 g of hydrazine solution (35% wt.) was added.

Dispersion properties: T.S.=30.1%, pH=8.1, B.V.=40 cP and P.S.=650 nm.

FIG. 5 shows the Transmission Electron Microscopy (TEM) picture of the dispersion obtained in Example 2.

Example 3

One-Pot Synthesis (Compare with Example 2)

Prepolymer

The following materials were charged to a reactor: 193 g of 67-1000 HNA (OH number 120.7 mg KOH/g), 44 g of Ruco 337 (OH number 130.1 mg KOH/g), 46 g of DMPA, 314 g of Desmodur W and 203 g of NMP. The reaction mixture was then heated to 200-220° F. (93.3-104.4° C.) and stirred 1 hour under a blanket of nitrogen. One drop of the catalyst FAS-CAT® was added. Stirring was continued at 210-220° F. (98.9-104.4° C.) for another 1.5 hours. The remaining NCO was measured at 6.45%. The prepolymer was cooled to 145-150° F. (62.8-65.5° C.). 38.3 g of TEA was charged to the prepolymer and allowed to mix for 35 min.

Dispersion and Extension

Neutralized prepolymer (700 grams) was charged over the course of about 5 minutes with mixing into water (2966 grams) at ambient temperature. The mixture was stirred for another 1 hour and to the formed dispersion, 23 g of hydrazine solution (35% wt.) was added. Dispersion properties: T.S.=17.7%, pH=8.2, B.V.=25 cP, P.S.=59 nm.

FIG. 6 shows the Transmission Electron Microscopy (TEM) picture of the dispersion obtained in Example 3.

Example 4

Elastic Core—Hard Shell

The procedure of Example 1 was followed utilizing the reagents and quantities set out in Table 1. Dispersion properties were not determined, as the dispersion tended to settle.

FIG. 7 shows the CryoSEM (Scanning Electron Microscopy) picture of the dispersion obtained in Example 4.

Example 5

Elastic Core (70%)—Hard Shell with an Internal Complex Structure

The procedure of Example 1 was followed utilizing the reagents and quantities set out in Table 1. Dispersion properties were not determined, as the dispersion tended to settle.

FIG. 8 shows the CryoSEM (Scanning Electroc Microscopy) picture of the particle with a complex internal structure obtained in Example 5.

TABLE 1

|  | Example 4 | Example 5 |
| --- | --- | --- |
| Core content, % (wt solids) | 30 | 70 |
|  | Ingredients, grams | |
| Core Prepolymer |  |  |
| 67-3000 HNA | 51 | 383 |
| IPDI | 7.0 | 53 |
| NCO/OH Ratio | 1.9 | 1.9 |
| Shell Prepolymer |  |  |
| PPG-425 | 023 | 38 |
| Desmodur W | 95 | 56 |
| DMPA | 16 | 27 |
| TMP | 1.4 | 1.9 |
| NMP | 22 | 83 |
| DMEA | 11 | 20 |
| NCO/OH Ratio | 1.9 | 1.9 |

Example 6

"Ice-Cream Cone" Particles Example

Preparation of Core Prepolymer

The following materials were charged to a reactor: 284 g of CAPA 2125 (OH number 92.5 mg KOH/g) and 117 g of Desmodur W were charged to a reactor. The reaction mixture was heated to about 210° F. (98.9° C.) under a blanket of nitrogen. One drop of the catalyst FASCAT® was added and the reaction mixture was stirred at 210-220° F. (98.9-104.4° C.) for 2.5 hours. The remaining NCO was measured at 4.39%. The reactor was cooled to 180° F. (82.2° C.).

Preparation of Shell Prepolymer

The following materials were charged to a reactor: 189 g of PPG-1025 (OH number 112.4 mg KOH/g) and 218 g of IPDI and heated to 210° F. (98.9° C.) under a blanket of nitrogen. The mixture was stirred at 210-220° F. (98.9-104.4° C.) for 1 hour. One drop of the catalyst FASCAT® was added and the reaction mixture was stirred at 210-220° F. (98.9-104.5° C.) for an additional 1 hour. The remaining NCO was measured at 18.28%. The mixture was cooled to 190° F. (87.8° C.). About 83 g of DMPA solution (64 g of DMPA dissolved in 133 g of NMP) at 158° F. (69.9° C.) was added and stirred at 190° F. (87.8° C.) for 10 minutes. Another 67 g of the DMPA solution was added and the mixture stirred for 15 minutes at 190° F. (87.8° C.). A further 44 g of the DMPA solution was added and the mixture was stirred at 190° F. (87.8° C.) for another 25 minutes. The reaction mixture was then heated to 205° F. (96.1° C.) and stirred at 202-210° F. (93.5-98.9° C.) for about 1.5 hours. The remaining NCO was measured at 7.46%. The prepolymer was cooled to 180° F. (82.2° C.).

Mixing of Prepolymers

Core prepolymer (135 grams) was added to the shell prepolymer resulting in a 20/80% wt. core/shell mixture. The blend was stirred at 180° F. (82.2° C.) for about 40 minutes. The blend NCO was measured at 6.65%. The blend was cooled to 140° F. (60.0° C.).

Neutralization, Dispersion and Extension

The prepolymer blend (300 grams) was charged over the course of about 5 minutes with mixing into water (946 grams) at 63° F. (17.0° C.) containing DMEA (17.5 grams). The defoamer DeeFo XHD-47J (0.2 grams) was added after about 20 minutes. The mixture was stirred for another 15 minutes and 17.4 grams of hydrazine solution (35 wt. %) was added to the formed dispersion. Dispersion properties: T.S.=22%, pH=7.5, B.V.=18 cP, P.S.=68 nm.

FIG. 9 shows the Transmission Electron Microscopy (TEM) picture of the dispersion obtained in Example 6.

Example 7

Polyester Core (50%)/Polycarbonate Shell (50%)

The procedure of Example 1 was followed utilizing the reagents and quantities set out in Table 2. Dispersion properties are given in Table 2 and results of hydrolytic stability studies are summarized in Table 3.

Comparative Example 8

One-Pot Synthesis (Compare with Example 7)

The procedure of Example 3 was followed utilizing the reagents and quantities set out in Table 2. Dispersion properties are given in Table 2 and results of hydrolytic stability studies are summarized in Table 3.

TABLE 2

| | Weight, gram | |
|---|---|---|
| Ingredients | Example 7 | Example 8 (Comparative) |
| Core Prepolymer | | One-Pot |
| 67-1000 HNA | 117 | 117 |
| Desmodur W | 63 | 63 |
| NCO/OH Ratio | 1.9 | 1.9 |
| Shell Prepolymer | | |
| Ruco 337 | 61 | 61 |
| IPDI | 98 | 98 |
| DMPA | 22 | 22 |
| NMP | 40 | 40 |
| DMEA | 16 | 16 |
| NCO/OH Ratio | 1.9 | 1.9 |
| Properties | | |
| Particle Size (nm) | 94 | 60 |
| Total Solids (%) | 38.7 | 38.3 |
| Ph | 8.3 | 8.3 |
| Viscosity (cP) | 40 | 95 |

TABLE 3

Hydrolytic Stability Study

| | Tensile Strength, psi | | Elongation at Break, % | | 100 M, psi | |
|---|---|---|---|---|---|---|
| | Ex. 7 | Ex. 8 | Ex. 7 | Ex. 8 | Ex. 7 | Ex. 8 |
| Day 2 | 5270 | 5270 | 386 | 360 | 2930 | 2980 |
| Day 4 | 4270 | 2980 | 330 | 130 | 2690 | — |
| Day 6 | 3420 | 3000 | 240 | 75 | 2710 | — |
| Day 10 | 2610 | — | 63 | — | — | — |

Example 9

Sliding Angle Example A

The procedure of Example 2 was followed utilizing the reagents and quantities set out in Table 4. Dispersion properties are given in Table 4 and results of sliding angle studies are summarized in Table 6.

Comparative Example 10

One-Pot Synthesis (Compare with Example 9)

The procedure of Example 3 was followed utilizing the reagents and quantities set out in Table 4. Dispersion properties are given in Table 4 and results of sliding angle studies are summarized in Table 6.

TABLE 4

| | Weight, grams | |
|---|---|---|
| Ingredients | Example 9 | Example 10 (Comparative) |
| Core Prepolymer | | One-Pot |
| 67-1000 HNA | 246 | 138 |
| Desmodur W | 135 | 78 |
| NCO/OH Ratio | 2.0 | 2.0 |

TABLE 4-continued

| | Weight, grams | |
|---|---|---|
| Ingredients | Example 9 | Example 10 (Comparative) |
| Shell Prepolymer | | |
| PPG-1025 | 103 | 59 |
| Desmodur W | 233 | 131 |
| DMPA | 46 | 26 |
| NMP | 85 | 48 |
| TEA | 44 | 25 |
| NCO/OH Ratio | 2.0 | 2.0 |
| Properties | | |
| Particle Size (nm) | 245 | 33 |
| Total Solids (%) | 22 | 31 |
| pH | 8.3 | 8.4 |
| Viscosity (cP) | 15 | 30 |

Example 11

Siliconized Core (Sliding Angle Example B)

The procedure of Example 2 was followed utilizing the reagents and quantities set out in Table 5. Dispersion properties are given in Table 5 and results of sliding angle studies are summarized in Table 6.

Comparative Example 12

One-Pot Synthesis (Compare with Example 11)

The procedure of Example 3 was followed utilizing the reagents and quantities set out in Table 5. Dispersion properties are given in Table 5 and results of sliding angle studies are summarized in Table 6.

TABLE 5

| | Weight, grams | |
|---|---|---|
| Ingredients | Example 11 | Example 12 (Comparative) |
| Core Prepolymer | | One-Pot |
| 67-1000 HNA | 106 | 106 |
| Desmodur W | 61 | 61 |
| Y-14209 | 19 | 19 |
| NCO/OH Ratio | 1.9 | 1.9 |
| Shell Prepolymer | | |
| PPG-1025 | 66 | 66 |
| IPDI | 97 | 97 |
| DMPA | 22 | 22 |
| NMP | 41 | 41 |
| DMEA | 16 | 16 |
| NCO/OH Ratio | 1.9 | 1.9 |
| Properties | | |
| Particle Size (nm) | 221 | 75 |
| Total Solids (%) | 40 | 36 |
| pH | 7.6 | 7.7 |
| Viscosity (cP) | 110 | 55 |

TABLE 6

| Sample ID | Sliding Angle, Degree |
|---|---|
| Example 9 | 40 |
| Example 10 | 78 |
| Example 11 | 26 |
| Example 12 | 77 |

Examples 13-17

Different Core-Shell Ratios: Polyester Core/Polyether Shell

Core/Polyether Shell

The procedure of Example 1 was followed utilizing the reagents and quantities set out in Table 7. Dispersion properties are given in Table 7.

TABLE 7

| | Ex. 13 | Ex. 14 | Ex. 15 | Ex. 16 | Ex. 17 |
|---|---|---|---|---|---|
| Core content, % (wt solids) | 20 | 30 | 40 | 50 | 60 |
| Ingredients, grams | | | | | |
| Core Prepolymer | | | | | |
| 67-1000 HNA | 41 | 62 | 75 | 147 | 143 |
| Desmodur W | 22 | 34 | 40 | 78 | 77 |
| NCO/OH Ratio | 1.90 | 1.90 | 1.90 | 1.90 | 1.90 |
| Shell Prepolymer | | | | | |
| PPG-1025 | 90 | 80 | 61 | 81 | 52 |
| IPDI | 132 | 117 | 90 | 117 | 77 |
| DMPA | 30 | 27 | 21 | 27 | 18 |
| NMP | 35 | 35 | 32 | 50 | 41 |
| DMEA | 29 | 20 | 15 | 20 | 13 |
| NCO/OH Ratio | 1.90 | 1.90 | 1.90 | 1.90 | 1.90 |
| Properties | | | | | |
| Particle Size (nm) | 65 | 68 | 88 | 110 | 209 |
| Total Solids (%) | 25.4 | 29.8 | 31.0 | 33 | 35.2 |
| pH | 8.8 | 7.8 | 7.8 | 8.2 | 8.5 |
| Viscosity (cP) | 23 | 45 | 28 | 23 | 28 |

Examples 18-19

Crosslinked Polyester Core/Polyether Shell

Dispersions consisting of crosslinked core and polyether shell were prepared by the method of Example 1 utilizing the reagents and quantities set out in Table 8. Dispersion properties are also given in Table 8.

TABLE 8

| | Example 18 | Example 19 |
|---|---|---|
| Core Content, % (wt solids) | 40 | 50 |
| Ingredients (grams) | | |
| Core Prepolymer | | |
| 67-500 HNA | 61 | 81 |
| Desmodur W | 75 | 100 |
| TMP | 2.8 | 3.7 |
| NCO/OH Ratio | 1.9 | 1.9 |

TABLE 8-continued

|  | Example 18 | Example 19 |
|---|---|---|
| Shell Prepolymer |  |  |
| PPG-1025 | 74 | 63 |
| IPDI | 109 | 92 |
| DMPA | 25 | 21 |
| NMP | 46 | 39 |
| DMEA | 18 | 15 |
| NCO/OH Ratio | 1.9 | 1.9 |
| Properties |  |  |
| Particle Size (nm) | 95 | 150 |
| Total Solids (%) | 35.8 | 34.8 |
| pH | 7.9 | 7.8 |
| Viscosity (cP) | 58 | 30 |

Examples 20-21

Aromatic Polyester Core/Polyether Shell

Dispersions consisting of aromatic core and polyether shell were prepared by the method of Example 1 utilizing the reagents and quantities set out in Table 9.

Comparative Example 22

Aromatic Polyester Core/Polyether Shell (Compare with Examples 21)

The procedure of Example 3 was followed utilizing the reagents and quantities set out in Table 9. Dispersion properties are also given in Table 9.

TABLE 9

|  | Ex. 20 | Ex. 21 | Ex. 22 (One-Pot) (Comparative) |
|---|---|---|---|
| Core Content, % (wt solids) | 30 | 50 | 50 |
| Ingredients (gram) |  |  |  |
| Core Prepolymer |  |  |  |
| 1000 BGA | 81 | 139 | 139 |
| TDI | 27 | 46 | 46 |
| NCO/OH Ratio | 1.9 | 1.9 | 1.9 |
| Shell Prepolymer |  |  |  |
| PPG-1025 | 90 | 66 | 66 |
| IPDI | 132 | 97 | 97 |
| DMPA | 30 | 22 | 22 |
| NMP | 40 | 41 | 41 |
| DMEA | 22 | 16 | 16 |
| NCO/OH Ratio | 1.9 | 1.9 | 1.9 |
| Properties |  |  |  |
| Particle Size (nm) | 76 | 88 | 38 |
| Total Solids (%) | 35.9 | 36.7 | 28.1 |
| pH | 8.3 | 8.2 | 7.5 |
| Viscosity (cP) | 76 | 125 | 23 |

Examples 23-24

Plasticized Polyester Core/Polyether Shell

The procedure of Example 1 was followed utilizing the reagents and quantities set out in Table 10. Dispersion properties are given in Table 10.

TABLE 10

|  | Weight, grams | |
|---|---|---|
| Ingredients | Ex. 23 | Ex. 24 |
| Core Prepolymer |  |  |
| Desmophen S-1015-120 | 217 | 217 |
| Desmodur W | 116 | 116 |
| NCO/OH Ratio | 1.9 | 1.9 |
| Shell Prepolymer |  |  |
| PPG-1025 | 119 | 119 |
| IPDI | 173 | 173 |
| DMPA | 40 | 40 |
| Benzy Benzoate | 35 | — |
| DOTP | — | 35 |
| DMEA | 29 | 29 |
| NCO/OH Ratio | 1.9 | 1.9 |
| Properties |  |  |
| Particle Size (nm) | 100 | 130 |
| Total Solids (%) | 30.7 | 37.2 |
| pH | 7.8 | 7.6 |
| Viscosity (cP) | 19 | 27 |

Example 25

Solvent-Free Polyester Core/Polyether Shell

The procedure of Example 1 was followed utilizing the reagents and quantities set out in Table 11. After chain extension was complete, the dispersion was subjected to redox initators to polymerize the 2-EHA. Under a blanket of nitrogen, tBHP was added and the reaction mixture was allowed to stir for approximately 10 minutes. Bruggolite® FF6 was then added and stirring continued for an additional 1 hour. The reaction vessel was placed in an oven set at 50° C. to drive the polymerization to completion. The residual content of 2-EHA was measured and found be about 42 ppm. Dispersion properties are given in Table 11.

TABLE 11

| Ingredients | Weight, gram |
|---|---|
| Core Prepolymer |  |
| 67-1000 HNA | 234 |
| Desmodur W | 126 |
| NCO/OH Ratio | 1.9 |
| Shell Prepolymer |  |
| PPG-1025 | 130 |
| IPDI | 187 |
| DMPA | 43 |
| 2-EHA | 80 |
| DMEA | 32 |
| NCO/OH Ratio | 1.9 |
| Redox |  |
| tBHP | 6.5 |
| Bruggolite ® FF6 | 34.9 |
| Properties |  |
| Particle Size (nm) | 94 |
| Total Solids (%) | 38.7 |
| pH | 8.3 |
| Viscosity (cP) | 40 |

Example 26

Polyester Core/Polyether Shell with Surfactant During Dispersion

The procedure of Example 1 was followed utilizing the reagents and quantities set out in Table 12. The surfactant was added to water prior to dispersion. Dispersion properties are given in Table 12.

TABLE 12

| Ingredients | Weight, grams |
|---|---|
| Core content, % (wt solids) | 50 |
| Core Prepolymer | |
| 67-1000 HNA | 91 |
| Desmodur W | 49 |
| NMP | 35 |
| NCO/OH Ratio | 1.9 |
| Shell Prepolymer | |
| PPG-1025 | 50 |
| IPDI | 73 |
| DMPA | 17 |
| NMP | 35 |
| DMEA | 12 |
| NCO/OH Ratio | 1.9 |
| Pluronic F68 LF Pastille | 9.1 |
| Properties | |
| Particle Size (nm) | 308 |
| Total Solids (%) | 35.2 |
| pH | 8.8 |
| Viscosity (cP) | 27 |

Example 27

Polyether Core/Polyether Shell

The procedure outlined in Example 1 was followed utilizing the reagents and quantities set out in Table 13. Dispersion properties are also listed in Table 13.

TABLE 13

| Ingredients | Weight, grams |
|---|---|
| Core content, % (wt solids) | 50 |
| Core Prepolymer | |
| PPG-1025 | 244 |
| Desmodur W | 116 |
| NCO/OH Ratio | 1.9 |
| Shell Prepolymer | |
| PPG-1025 | 129 |
| IPDI | 188 |
| DMPA | 43 |
| NMP | 80 |
| DMEA | 32 |
| NCO/OH Ratio | 1.9 |
| Properties | |
| Particle Size (nm) | 143 |
| Total Solids (%) | 30 |
| pH | 8.2 |
| Viscosity (cP) | 21 |

Example 28

Polyester Core (with Acid)/Polyether Shell (with Acid)

The procedure outlined in Example 1 was followed utilizing the reagents and quantities set out in Table 14. Dispersion properties are also listed in Table 14.

TABLE 14

| Ingredients | Weight, grams |
|---|---|
| Core content, % (wt solids) | 50 |
| Core Prepolymer | |
| 67-1000 HNA | 172 |
| Desmodur W | 105 |
| DMPA | 3 |
| NMP | 70 |
| DMEA | 2 |
| NCO/OH Ratio | 1.9 |
| Shell Prepolymer | |
| PPG-1025 | 43 |
| Desmodur W | 62 |
| DMPA | 14 |
| NMP | 30 |
| DMEA | 10 |
| NCO/OH Ratio | 1.9 |
| Properties | |
| Particle Size (nm) | 30.5 |
| Total Solids (%) | 108 |
| pH | 9.3 |
| Viscosity (cP) | 20 |

Example 29

Polyester Core/Polycarbonate Shell (with Tegomer) Non-Ionic Stabilization Example Preparation of Core Prepolymer The following materials were charged to a reactor: 43.1 g of 67-1000 HNA (OH number 121.5 mg KOH/g) and 23.2 g of Desmodur W. The reaction mixture was then heated to 210-220° F. (98.9-104.4° C.) and stirred 1 hour under a blanket of nitrogen. One drop of the catalyst FASCAT® was added. Stirring was continued at 210-220° F. (98.9-104.4° C.) for another 1.5 hours. The remaining NCO was measured at 5.04%. The reactor was cooled to 180° F. (82.2° C.).

Preparation of Shell Prepolymer

The following materials were charged to a reactor: 43.8 g of Ruco 337 (OH number 130.1 mg KOH/g), 72.8 g of IPDI and 148.4 g of Tegomer D3403. The reaction mixture was then heated to 205° F. (96.1° C.) and stirred 1 hour under a blanket of nitrogen. One drop of the catalyst FASCAT® was added. Stirring was continued at 205° F. (96.1° C.) for another 1.5 hours. The remaining NCO was measured at 4.10%. The prepolymer was cooled to 180° F. (82.2° C.).

Mixing of Prepolymers 66 g of core prepolymer was added to the shell prepolymer resulting in a 20/80% wt. mixture. The prepolymer mixture was stirred at 180° F. (82.2° C.) for 15-20 min. The overall NCO was measured and found to be 4.27%. The prepolymer blend was cooled to 140° F. (60° C.) and the viscosity was found to be 3700 cP.

Dispersion and Extension 295 g of the mixed prepolymer was charged over the course of about 5 minutes with mixing into water (625 grams at ambient temperature). The mixture was stirred for 40 minutes and to the formed dispersion, 8.3 g of hydrazine solution (35% wt.) was added. Dispersion properties: T.S.=32.3%, pH=4-.1, B.V.=85 cP, P.S.=264 nm.

Example 30

Polyester Core/Polycarbonate (with Tegomer/DMPA) Shell: Anionic/Non-Ionic Mixed Stabilization Example The procedure outlined in Example 1 was followed utilizing the reagents and quantities set out in Table 15. Dispersion properties are also listed in Table 15.

TABLE 15

| Ingredients | Weight, grams |
| --- | --- |
| Core content, % (wt solids) | 50 |
| Core Prepolymer | |
| 67-1000 HNA | 173 |
| Desmodur W | 95 |
| NCO/OH Ratio | 1.9 |
| Shell Prepolymer | |
| Ruco 337 | 46 |
| IPDI | 109 |
| Tegomer D3403 | 97 |
| DMPA | 17 |
| NMP | 60 |
| DMEA | 12 |
| NCO/OH Ratio | 1.90 |
| Properties | |
| Particle Size (nm) | 190 |
| Total Solids (%) | 35.6 |
| pH | 7.8 |
| Viscosity (cP) | 105 |

Example 31

Solvent-Free Polyester Core/Polycarbonate (with Tegomer/DMPA) Shell: Anionic/Non-Ionic Mixed Stabilization Example The procedure outlined in Example 1 was followed utilizing the reagents and quantities set out in Table 16. Dispersion properties are also listed in Table 16.

TABLE 16

| Ingredients | Weight, grams |
| --- | --- |
| Core content, % (wt solids) | 50 |
| Core Prepolymer | |
| 67-1000 HNA | 129.4 |
| Desmodur W | 70.6 |
| NCO/OH Ratio | 1.90 |
| Shell Prepolymer | |
| PPG 1025 | 85.9 |
| IPDI | 81.4 |
| Tegomer D3403 | 19.9 |
| DMPA | 12 |
| NMP | 0 |

TABLE 16-continued

| Ingredients | Weight, grams |
| --- | --- |
| DMEA | 9 |
| NCO/OH Ratio | 1.90 |
| Properties | |
| Particle Size (nm) | 125 |
| Total Solids (%) | 33.8 |
| pH | 7.3 |
| Viscosity (cP) | 23 |

Example 32

Polyester Core (with Acid)/Polyether Shell (with Acid) (Repeat of Example 2 in U.S. Pat. No. 5,959,003)

Preparation of Core Prepolymer

The following materials were charged to a reactor: 75.0 g of Desmophen S-102-55 (OH number 56.5 mg KOH/g), 17.8 g of IPDI and 10.6 g of NMP. The mixture was heated to 190° F. (87.8° C.) under a blanket of nitrogen, followed by addition of one drop of the catalyst FASCAT®. 1.91 g of DMPA was added and the mixture stirred at 210-220° F. (98.9-104.4° C.) for 2.5 hours. The remaining NCO was measured using a titration with DBA and 1.0M HCl, and was found to be 2.06%. The reaction mixture was cooled to 150° F. (65.5° C.). 1.4 g of TEA was charged to the mixture and allowed to mix for about 15 min. The prepolymer was then cooled to about 140° F. (60.0° C.).

Preparation of Shell Prepolymer

The procedure described for the preparation of the core prepolymer in this example was followed. The following the reagents and quantities were used: 150.0 g of PTHF 2000 (OH number 57.5 mg KOH/g), 104.1 g of IPDI, 30.5 g of DMPA, 61 g of NMP and 23.0 g of TEA.

Mixing of Prepolymers and Dispersion Formation

The neutralized prepolymers were then together charged over the course of about 5 minutes with mixing into water (962 grams) at about 60° F. (15.5° C.). The defoamer DeeFo XHD-47J (0.2 grams) was added after a few minutes. The mixture was stirred for about 40 min and 14.2 grams of hydrazine solution (35 wt. %) was added to the formed dispersion. The dispersion showed some sediment upon standing for several hours (unstable dispersion).

FIG. 10 shows the Transmission Electron Microscopy (TEM) picture of the dispersion obtained in Example 32.

Example 33

Polyester Core (with Acid)/Brominated Polyether Shell (with Acid) (Control Experiment—Repeat of Example 32 with Brominated Shell)

The procedure of Example 32 was followed utilizing the reagents and quantities set out in Table 17. The dispersion showed some heavy sediment upon standing for several hours (unstable dispersion).

FIG. 11 shows the Transmission Electron Microscopy (TEM) picture of the dispersion obtained in Example 33.

Example 34

Brominated Polyester Core (with Acid)/Polyether Shell (with Acid) (Control Experiment—Repeat of Example 32 with Brominated Core)

The procedure of Example 32 was followed utilizing the reagents and quantities set out in Table 17. The dispersion showed some heavy sediment upon standing for several hours (unstable dispersion).

FIG. 12 shows the Transmission Electron Microscopy (TEM) picture of the dispersion obtained in Example 34.

TABLE 17

|  | Weight, grams | |
| --- | --- | --- |
| Ingredients | Example 33 | Example 34 |
| Core Prepolymer | | |
| Desmophen S-102-55 | 101.5 | 67.3 |
| IPDI | 24.1 | 25.0 |
| DMPA | 2.6 | 2.0 |
| FR-522 | — | 5.0 |
| NMP | 14.4 | 11.3 |
| TEA | 1.95 | 1.5 |
| NCO/OH Ratio | 1.54 | 1.66 |
| Shell Prepolymer | | |
| PTHF 2000 | 122.6 | 152.8 |
| IPDI | 186.9 | 106.1 |
| DMPA | 54.8 | 31 |
| FR-522 | 19.2 | — |
| NMP | 93.1 | 78.3 |
| TEA | 41.4 | 23.4 |
| NCO/OH Ratio | 1.54 | 1.54 |

Example 35

Polyester Core (No Acid)/Polyether (with Acid) Shell (Revised) Recipe—Using U.S. Pat. No. 5,959,003 Procedure of Example 2

In this comparative example, the recipe used is the same as in Example 9 and the procedure followed was as described in example 32, which is basically the same as the procedure of Example 2 in the U.S. Pat. No. 5,959,003 patent. The precise quantities used are shown in Table 18. The dispersion showed very heavy sediment (phase separation) upon standing (very unstable dispersion).

TABLE 18

| Ingredients | Weight, grams |
| --- | --- |
| Core content, % (wt solids) | 50 |
| Core Prepolymer | |
| 67-1000 HNA | 170 |
| Desmodur W | 94 |
| NCO/OH Ratio | 1.9 |
| Shell Prepolymer | |
| PPG-1025 | 94 |
| IPDI | 139 |
| DMPA | 32 |
| NMP | 59 |

TABLE 18-continued

| Ingredients | Weight, grams |
| --- | --- |
| DMEA | 23 |
| NCO/OH Ratio | 1.9 |

Example 36

One-Pot Core-Shell Synthesis—In-Situ Blocked Polyester Core/Brominated Polyether Shell Preparation of Blocked Core Prepolymer The following materials were charged to a reactor: 126.2 g of 67-1000 HNA (OH number 122.7 mg KOH/g) and 68.8 g of Desmodur W. The reaction mixture was heated to 190° F. (87.8° C.) with stirring followed by the addition of one drop of the catalyst FASCAT® under a blanket of nitrogen. Stirring was continued at 210-220° F. (98.9-104.4° C.) for approximately 2.5 hours. The remaining NCO was measured using a titration with DBA and 1.0M HCl, and was found to be 5.10%. The reaction mixture was cooled to 160° F. (71.1° C.). 98.9 g of 2-butanone oxime was added to the mixture dropwise. The mixture was warmed to 180° F. (82.2° C.) and stirred for an additional 1 hour. The residual NCO was checked by IR and found to have been completely consumed. The prepolymer was then cooled to about 150° F. (65.5° C.).

In-Situ Preparation of Shell Prepolymer and Mixing

The following materials were charged to a reactor: 120.1 g of PPG-1025 (OH number 110.6 mg KOH/g), 257.8 g of IPDI, 22.7 g of FR-522 and 60 g of NMP. The resulting reaction mixture was heated to 190° F. (87.8° C.) followed by the addition of one drop of the catalyst FASCAT®. 54.3 g of DMPA was added in two portions and the mixture was heated to 205° F. (96.1° C.). The reaction mixture was stirred at 205-210° F. (96.1-98.9° C.) for 2.0 hours and the remaining NCO was measured at 4.66%. The prepolymer was cooled to 140° F. (60.0° C.). At this point, the prepolymer appeared thick and an additional 28 g NMP was added to lower the viscosity of the prepolymer. The viscosity was measured and found to be 18,300 cP at 140° F. (60.0° C.).

Neutralization, Dispersion, Deblocking and Extension

The prepolymer (651 grams) was charged over the course of about 5 minutes with mixing into water (1200 grams) at 62° F. (16.5° C.) containing DMEA (31.6 grams). The defoamer DeeFo XHD-47J (0.2 grams) was added after about 5 min. The mixture was stirred for about 30 min and 17.7 grams of hydrazine solution (35 wt. %) was added to the formed dispersion. The dispersion gave a somewhat milky white dispersion. Dispersion properties: T.S.=30.7%, pH=8.2, B.V.=34 cP, P.S.=60 nm.

Example 37

One-Pot Core-Shell Synthesis—Blocked Isocyanate Prepolymer Core (Commercial)/Brominated Polyether Shell Preparation of Core/Shell Prepolymer Mixture The following materials were charged to a reactor: 84.8 g of PPG-1025 (OH number 110.6 mg KOH/g), 182.5 g of IPDI, 16.1 g of FR-522 and 113.6 g of NMP. The mixture was heated to 190° F. (87.8° C.) and one drop of the catalyst FASCAT® was added. 51.0 g of DMPA was added in small portions and the reaction mixture was heated to 210° F. (98.9° C.) under a blanket of nitrogen and stirred at 210-220° F. (98.9-104.4° C.) for 2.5 hours. The remaining NCO was measured at 7.41%. The prepolymer was cooled to 180° F. (82.2° C.) and 183.2 g of Desmocap 12A was added giving a 50/50% wt core/shell mixture. The resulting prepolymer blend was stirred for 30-45 minutes and cooled to 140° F. (60.0° C.). The viscosity was measured and found to be 16,800 cP at 140° F. (60.0° C.).

Neutralization, Dispersion and Extension

The prepolymer blend (677 grams) was charged over the course of about 5 minutes with mixing into water (1200 grams, at 60° F.) containing DMEA (25.1 grams). The defoamer DeeFo XHD-47J (0.2 grams) was added after about 5 min. The mixture was stirred for about 1 hour and 19.6 grams of hydrazine solution (35 wt. %) was added to the formed dispersion. The dispersion was milky white.

Dispersion properties: T.S.=23%, pH=7.9, B.V.=14 cP, P.S.=210 nm.

Example 38

One-Pot Core-Shell Synthesis—Unblocked Isocyanate Prepolymer Core (Commercial)/Brominated Polyether Shell The procedure outlined in Example 37 was followed utilizing the reagents and quantities set out in Table 19. Dispersion properties are also listed in Table 19.

TABLE 19

| Ingredients | Weight, grams |
|---|---|
| Core content, % (wt solids) | 30 |
| Core Prepolymer | |
| Isonate 240 Prepolymer | 202.5 |
| Shell Prepolymer | |
| PPG 1025 | 125 |
| IPDI | 268 |
| FR-522 | 24 |
| DMPA | 56 |
| NMP | 101 |
| DMEA | 41 |
| NCO/OH Ratio | 1.90 |
| Properties | |
| Particle Size (nm) | 71 |
| Total Solids (%) | 36.7 |
| pH | 8.7 |
| Viscosity (cP) | 71 |

Example 39

Example with Two Prepolymers with Same Acid Number

The procedure outlined in Example 1 was followed utilizing the reagents and quantities set out in Table 20. Dispersion properties are also listed in Table 20.

TABLE 20

| Ingredients | Weight, grams |
|---|---|
| Core content, % (wt solids) | 50 |
| Prepolymer 1 | |
| 3000 HA | 210 |
| Desmodur W | 90 |
| DMPA | 15 |
| NMP | 53 |
| DMEA | 11 |
| NCO/OH Ratio | 1.90 |
| Prepolymer 2 | |
| PPG-1025 | 178 |
| IPDI | 122 |
| DMPA | 15 |
| NMP | 50 |
| DMEA | 11 |
| NCO/OH Ratio | 1.90 |
| Properties | |
| Particle Size (nm) | 94 |
| Total Solids (%) | 41 |
| pH | 7.3 |
| Viscosity (cP) | 220 |

What is claimed is:

1. A method of preparing an aqueous dispersion of at least two polyurethane prepolymers having different hydrophilicities, wherein said prepolymers are prepared in the same reactor which comprises:
   (a) preparing a first isocyanate terminated prepolymer;
   (b) protecting (blocking) the unreacted isocyanate groups in the first isocyanate terminated prepolymer by reacting it with a blocking agent to obtain a blocked first prepolymer;
   (c) preparing a second isocyanate terminated prepolymer in the presence of said first prepolymer to form a mixture of said prepolymers, wherein said mixture is devoid of water;
   (d) optionally protecting the unreacted isocyanate groups of the second prepolymer;
   (e) optionally repeating the preparation and protecting steps of subsequent prepolymers;
   (f) optionally deblocking said protected groups after all prepolymers have been prepared; and
   (g) dispersing said mixture of prepolymers in an aqueous medium.

2. A method of claim 1 wherein in the preparation of each prepolymer at least one different reactant is employed, where the reactants are selected from aromatic isocyanates, aliphatic isocyanates, araliphatic isocyanates, polyether polyols, polyester polyols, polycarbonate polyols, polyacetal polyols, polycaprolactone polyols, alkylene glycols, polyacrylates polyols, silicone polyols, halogenated polyols, chain extenders, water dispersability enhancing compounds, or polyols of different molecular weights.

3. A method of claim 1 wherein different hydrophilicities are achieved by incorporating different levels of acid, as measured by weight percent, equivalents or acid number, in neutralized or unneutralized form.

4. A method of claim 1 wherein said prepolymers are optionally neutralized or chain extended or both neutralized and chain extended before, during or after the dispersion step.

5. A method of claim 1 wherein one prepolymer, that is relatively less hydrophilic, has an acid number from 0 to 10, and the other prepolymer, that is relatively more hydrophilic, has an acid number from 20 to 80.

6. A method of claim 5 wherein said less hydrophilic prepolymer has an acid number from 0 to 5 and said relatively more hydrophilic prepolymer has an acid number from 35 to 60.

7. A method of claim 5 wherein said less hydrophilic prepolymer has an acid number below 1 and said relatively more hydrophilic prepolymer has an acid number from 25 to 80.

8. A method of claim 1 wherein said prepolymers have the isocyanate (NCO) to active hydrogen equivalent ratio of about 1.3:1 to about 2.5:1.

9. A method of claim 8 wherein said equivalent ratio is about 1.5:1 to about 2.1:1.

10. A method of claim 8 wherein said equivalent ratio is about 1.7:1 to about 2:1.

11. A method of claim 1 wherein said prepolymers are neutralized before forming a water dispersion.

12. A method of claim 1 wherein at least one water-dispersibility enhancing compound is incorporated into one prepolymer or all prepolymers.

13. A method of claim 12 wherein said water-dispersibility enhancing compound is selected from at least one non-ionic compound.

14. A method of claim 12 wherein said water-dispersibility compound is selected from dimethylol propionic acid, dimethylol butanoic acid, and combinations thereof.

15. A method of claim 12 wherein at least one prepolymer contains a water-dispersibility compound that contains both non-ionic and anionic groups.

16. A method of claim 1 wherein a water-dispersibility enhancing compound is incorporated into all prepolymers.

17. A method of claim 5 wherein a water-dispersibility enhancing compound is incorporated into said relatively more hydrophilic prepolymer.

18. A method of claim 1 wherein a surfactant is employed.

19. A method of claim 18 wherein a surfactant is employed during the dispersing stage.

20. A method of claim 1 wherein at least one catalyst is employed.

21. A method of claim 1 wherein at least one reactive diluent is employed.

22. A method of claim 21 wherein the reactive diluent is a polymerizable monomer.

23. A method of claim 1 wherein at least one solvent is employed.

24. A method of claim 1 wherein at least one branching monomer is employed.

25. A method of claim 1 wherein at least one plasticizer is employed.

26. A method of claim 1 wherein said prepolymers contain carboxyl groups which are neutralized.

27. A method of claim 1 wherein chain extension is carried out.

28. A method of claim 1 wherein said at least two polyurethane prepolymers form non-uniform particles have primarily core-shell morphology when dispersed in an aqueous media.

29. A method of claim 1 wherein said at least two polyurethane prepolymers form non-uniform particles having primarily gradient morphology when dispersed in an aqueous media.

30. A method of claim 1 wherein said at least two polyurethane prepolymers form non-uniform particles having primarily "ice-cream cone" morphology when dispersed in an aqueous media.

31. A method of claim 1 wherein said at least two polyurethane prepolymers form non-uniform particles having primarily "raspberry" morphology when dispersed in an aqueous media.

32. A method of claim 1 wherein said at least two polyurethane prepolymers form non-uniform particles having primarily "salt-and-pepper" morphology when dispersed in an aqueous media.

33. A method of claim 1 wherein said at least two polyurethane prepolymers form non-uniform particles having two or more different morphologies when dispersed in an aqueous media.

34. A method of preparing a prepolymer composition comprising at least two polyurethane prepolymers which comprises:
(a) preparing a first isocyanate terminated prepolymer;
(b) protecting (blocking) the unreacted isocyanate groups in the first prepolymer by reacting said groups with a blocking agent to obtain a blocked first prepolymer;
(c) preparing a second isocyanate terminated prepolymer in the presence of the blocked first prepolymer to form a mixture of prepolymers, wherein said mixture is devoid of water;
(d) optionally protecting the unreacted isocyanate groups of the second prepolymer;
(e) optionally repeating the preparation and protecting steps of subsequent isocyanate terminated prepolymers;
(f) optionally deblocking said protected groups after all prepolymers have been prepared.

35. A method of claim 34 further comprising
(g) dispersing said mixture of prepolymers in the optional presence of at least one chain extender in an aqueous medium to form a dispersion of non-uniform particles; and
(h) optionally adding a chain extender after the formation of the dispersion.

36. A method of claim 34 wherein in the preparation of each prepolymer at least one different reactant is employed, where the reactants are selected from aromatic isocyanates, aliphatic isocyanates, araliphatic isocyanates, polyether polyols, polyester polyols, polycarbonate polyols, polyacetal polyols, polycaprolactone polyols, alkylene glycols, polyacrylates polyols, silicone polyols, halogenated polyols, chain extenders, water dispersability enhancing compounds, and polyols of different molecular weights.

37. A method of claim 34 wherein said prepolymers are optionally neutralized or chain extended or both neutralized and chain extended before, during or after the dispersion step.

38. A method of claim 34 wherein said prepolymers are neutralized prior to mixing or after mixing the prepolymers but before forming a water dispersion.

39. A method of claim 34 wherein at least one water-dispersibility enhancing compound is incorporated into at least one prepolymer.

40. A method of claim 39 wherein said water-dispersibility enhancing compound is selected from at least one non-ionic compound.

41. A method of claim 39 wherein said water-dispersibility compound is selected from dimethylol propionic acid, dimethylol butanoic acid, and combinations thereof.

42. A method of claim 34 wherein at least one prepolymer contains a water-dispersibility compound that contains both non-ionic and anionic groups.

43. A method of claim 39 wherein a water-dispersibility enhancing compound is incorporated into all prepolymers.

44. A method of claim 27 wherein said polyurethane prepolymers are crosslinked.

* * * * *